United States Patent
Minoo et al.

(10) Patent No.: US 9,992,503 B2
(45) Date of Patent: *Jun. 5, 2018

(54) SCALABLE VIDEO CODING WITH ENHANCED BASE LAYER

(71) Applicant: GOOGLE TECHNOLOGY HOLDINGS LLC, Mountain View, CA (US)

(72) Inventors: Koohyar Minoo, San Diego, CA (US); Ajay K. Luthra, San Diego, CA (US); David M. Baylon, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/398,840

(22) Filed: Jan. 5, 2017

(65) Prior Publication Data

US 2017/0180743 A1 Jun. 22, 2017

Related U.S. Application Data

(63) Continuation of application No. 13/893,369, filed on May 14, 2013, now Pat. No. 9,544,587.

(60) Provisional application No. 61/646,731, filed on May 14, 2012.

(51) Int. Cl.
*H04N 19/30* (2014.01)
*H04N 19/184* (2014.01)

(52) U.S. Cl.
CPC ........... *H04N 19/30* (2014.11); *H04N 19/184* (2014.11)

(58) Field of Classification Search
CPC .............................. H04N 19/63; H04N 19/619
USPC .......................................................... 375/240
See application file for complete search history.

(56) References Cited

U.S. PATENT DOCUMENTS

| | | | |
|---|---|---|---|
| 5,315,388 A | 5/1994 | Shen et al. | |
| 5,386,212 A | 1/1995 | Shen et al. | |
| 5,477,397 A | 12/1995 | Naimpally et al. | |
| 5,617,142 A | 4/1997 | Hamilton | |
| 5,619,733 A | 4/1997 | Noe et al. | |
| 5,633,684 A * | 5/1997 | Teranishi | H04N 19/63 375/240.11 |
| 5,638,128 A | 6/1997 | Hoogenboom et al. | |
| 5,675,387 A | 10/1997 | Hoogenboom et al. | |

(Continued)

FOREIGN PATENT DOCUMENTS

| | | |
|---|---|---|
| EP | 1032214 A2 | 8/2000 |
| JP | 2006180173 A | 7/2006 |
| WO | 9739584 A1 | 10/1997 |

OTHER PUBLICATIONS

Three dimensional subband coding with motion Ohm 1994.*

(Continued)

*Primary Examiner* — Luis Perez Fuentes
(74) *Attorney, Agent, or Firm* — Young Basile Hanlon & MacFarlane, P.C.

(57) ABSTRACT

Disclosed is a method comprising: (a) receiving a layer 0 bitstream, the layer 0 bitstream including coding information for the layer 0 bitstream; (b) receiving a layer 1 bitstream, the layer 1 bitstream including coding information for the layer 1 bitstream; and (c) reconstructing the layer 0 bitstream using previously received information for another layer 0 bitstream and previously received information for another layer 1 bitstream.

12 Claims, 21 Drawing Sheets

(56) References Cited

U.S. PATENT DOCUMENTS

| | | |
|---|---|---|
| 5,767,987 A | 6/1998 | Wolff et al. |
| 5,832,120 A | 11/1998 | Prabhakar et al. |
| 5,844,541 A | 12/1998 | Cahill, III |
| 5,909,518 A | 6/1999 | Chui |
| 5,923,814 A | 7/1999 | Boyce |
| 5,926,573 A | 7/1999 | Kim et al. |
| 5,933,500 A | 8/1999 | Blatter et al. |
| 6,192,154 B1 | 2/2001 | Rajagopalan et al. |
| 6,208,765 B1 | 3/2001 | Bergen |
| 6,275,536 B1 | 8/2001 | Chen et al. |
| 6,285,804 B1 | 9/2001 | Crinon et al. |
| 6,349,154 B1 | 2/2002 | Kleihorst |
| 6,377,713 B1 | 4/2002 | Vuong |
| 6,441,754 B1 | 8/2002 | Wang et al. |
| 6,445,828 B1 | 9/2002 | Yim |
| 6,580,754 B1 | 6/2003 | Wan et al. |
| 6,628,845 B1 | 9/2003 | Stone et al. |
| 6,647,061 B1 | 11/2003 | Panusopone et al. |
| 6,650,704 B1 | 11/2003 | Carlson et al. |
| 6,674,796 B1 | 1/2004 | Haskell et al. |
| 6,728,315 B2 | 4/2004 | Haskell et al. |
| 6,782,132 B1 | 8/2004 | Fogg |
| 6,785,334 B2 | 8/2004 | van der Schaar et al. |
| 6,907,075 B2 | 6/2005 | Felts et al. |
| 7,512,180 B2* | 3/2009 | Florencio ............ H04N 19/63 375/240.12 |
| 7,602,997 B2 | 10/2009 | Young |
| 7,876,820 B2* | 1/2011 | Auwera ............ H04N 19/63 375/240.11 |
| 8,250,618 B2 | 8/2012 | Rosenzweig et al. |
| 8,306,113 B2* | 11/2012 | Kimoto ............ H04N 19/63 375/240.11 |
| 8,396,114 B2 | 3/2013 | Gu et al. |
| 8,855,198 B2* | 10/2014 | Kimoto ............ H04N 19/63 375/240.11 |
| 9,031,129 B2* | 5/2015 | Xu ............ H04N 19/63 375/240.11 |
| 9,215,458 B1 | 12/2015 | Kjeldaas |
| 9,544,587 B2 | 1/2017 | Minoo et al. |
| 2002/0071052 A1 | 6/2002 | Itoh et al. |
| 2005/0069212 A1 | 3/2005 | Bottreau et al. |
| 2006/0008038 A1* | 1/2006 | Song ............ H04N 19/63 375/350 |
| 2006/0013311 A1* | 1/2006 | Han ............ H04N 19/63 375/240.19 |
| 2006/0114990 A1 | 6/2006 | Pak |
| 2007/0133680 A1* | 6/2007 | Kimoto ............ H04N 19/63 375/240.12 |
| 2009/0175333 A1* | 7/2009 | Hsiang ............ H04N 19/63 375/240.12 |
| 2009/0187955 A1 | 7/2009 | Sullivan et al. |
| 2010/0208795 A1* | 8/2010 | Hsiang ............ H04N 19/63 375/240.2 |
| 2012/0082243 A1* | 4/2012 | Baylon ............ H04N 19/619 375/240.26 |
| 2012/0154370 A1 | 6/2012 | Russell et al. |
| 2012/0170646 A1* | 7/2012 | Baylon ............ H04N 19/619 375/240.02 |
| 2017/0180743 A1* | 6/2017 | Minoo ............ H04N 19/30 |

OTHER PUBLICATIONS

Motion-compensated highly scalable video compression using an adaptive 3D wavelet transform based on lifting; Secker et. al; Oct. 2001.*

Spatial scalable video coding using a combined subband-DCT approach; Benzler et al; Oct. 2000.*

Bankoski et al. "Technical Overview of VP8, An Open Source Video Codec for the Web". Dated Jul. 11, 2011, pp. 1-6.

Bankoski et al. "VP8 Data Format and Decoding Guide" Independent Submission. RFC 6389, Dated Nov., 2011, pp. 4-14, 30-35, 42-59, 76-96, 129.

Bankoski et al. "VP8 Data Format and Decoding Guide; draft-bankoski-vp8-bitstream-02" Network Working Group. Internet-Draft, May 18, 2011, 288, pp. 4-18, 34-38, 46-64, 82-103, 121.

Hsu et al. Power-Scalable Multi-Layer Halftone Video Display for Electronic Paper. 2008 IEEE International conference on Multimedia and Expo, 2008, pp. 1445-1448.

Mozilla, "Introduction to Video Coding Part 1: Transform Coding", Video Compression Overview, Mar. 2012, 171, pp. 15-43, 148-156, 161-168.

Overview; VP7 Data Format and Decoder. Version 1.5. On2 Technologies, IxNC. Dated Mar. 28, 2005, pp. 4-10, 27-31, 49-52, 60-64.

Schulzrinne, H., et al. RTP: A Transport Protocol for Real-Time Applications, RFC 3550. The Internet Society. Jul., 2003, pp. 7-8, 49-54.

Series H: Audiovisual and Multimedia Systems; Infrastructure of audiovisual services—Coding of moving video. H.264. Amendment 2: New profiles for professional applications. International Telecommunication Union. Dated Apr., 2007, pp. 5-9, 26-41, 61-66.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun., 2006, pp. 1-7.

Series H: Audiovisual and Multimedia Systems; Infrastructure of audiovisual services—Coding of moving video; Advanced video coding for generic audiovisual services. H.264. Version 3. International Telecommunication Union. Dated Mar., 2005, pp. 1-35, 116-193, 249-259, 264-274.

VP6 Bitstream & Decoder Specification. Version 1.03. On2 Technologies, IxNC. Dated Oct. 29, 2007, pp. 7-13, 20-26, 92-94.

Wilkins, P. "Real-time video with VP8/WebM." Retrieved from htt;://webm.googlecode.com/files/realtime_VP8_2-9-2011.pdf, pp. 2-13.

Wee, S.J., et al., "Efficient Processing of Compressed Video", IEEE, vol. 1, 1998, pp. 855-859.

Wee, S.J., et al., "Field-to Frame Transcoding with Spatial and Temporal Downsampling", IEEE, vol. 4 of 4, Oct. 24, 1999, pp. 271-275.

Bjork, Niklas et al., "Transcoder Architectures for Video Coding," IEEE Transactions on Consumer Electronics, Vil. 44, No. 1, Feb. 1998, pp. 88-98.

Boyce, J.M., "Data Selection Strategies of Digital VCr Long Play Mode," Digest of Technical Papers for the International Conference on Consumer Electronics, New York, Jun. 21, 1994, pp. 32-33.

C. Yim and M. A. Isnardi, "An Efficient Method for DCT-Domain Image Resizing with Mixed Field/ Frame-Mode Macroblocks," IEEE Trands. Circ. And Syst. For Video Technology, vol. 9, No. 5, Aug. 1999, pp. 696-700.

Dogan, S., et al., "Efficient MPEG-4/H.263 Video Transcoder for Interoperability of Heterogeneous Multimedia Networks", Electronics Letters, vol. 35, No. 11, May 27, 1999, pp. 863-864.

G. Keesman et al., "Transcoding of MPEG bitstreams," Signal Processing: Image Communication, vol. 8, 1996. pp. 481-500.

Gebeloff, Rob., "The Missing Link," http://www.talks.com/interactive/misslink-x.html, Nov. 24, 1998, pp. 1-2.

International Search Report, & Written Opinion of the International Searching Authority for International Application No. PCT/US2013/040889 (CS40212), Aug. 21, 2013, 10 pages.

Morrison, D.G., et al., "Reduction of Bit-Rate of Compressed Video While in its Coded Form", International Workshop on Packet Video, Sep. 1, 1994, pp. D17.1-D17.4.

Patent Abstracts of Japan, Abstract of Japanese Patent "Image Information Converter and Method", Publication No. 20001204026, Jul. 27, 2001.

R. Dugad and N. Ahuja, "A Fast Scheme for Downsampling and Upsampling in the DCT Domain," ICIP99, 1999 IEEE, pp. 909-913.

Rama Kalluri et al.: "Single-Loop Motion-Compensated based Fine-Granular Scalability (MC-FGS), with cross-checked results", 55. MPEG Meeting; Jan. 15, 2001-Jan. 19, 2001; PISA; (Motion Picture Expert Group or ISO/IEC JTC1/SC29/WG11), No. M6831, Jan. 14, 2011, all pages.

(56) References Cited

OTHER PUBLICATIONS

Shen, B., et al., "Adaptive Motion-Vector Resamplig for Compressed Video Downscaling", IEEE Transactions on circuits and Systems for Video Technology, IEE, vol. 9, No. 6, Sep. 1999, pp. 929-936.

Song, J., et al., "Fast Extraction of Spatially Reduced Image Sequenses from MPEG-2 Compressed Video", IEEE Transactions on Circuits and Systems for Video Technology, IEE, vol. 9, No. 7, Oct. 1999, pp. 1100-1114.

Staff of Cable Television Laboratories Inc., "Digital Tv Solutions," From the Labs: Cable World, Feb. 1, 1999, p. 1.

Steffen Kamp et al.: "Quality scalable low delay video coding using leaky base layer prediction", Communications and Information Technologies, 2007, ISCIT '07, International Symposium on, IEEE, PI Oct. 1, 2007, pp. 541-545.

Vetro, Anthony et al. "Frequency Domain Down-Conversion of HDTV Using Adaptive Motion Compensation," IEEE Comput. Soc., Oct. 1997, pp. 763-766.

Yao et a. Scalable Video Coding in a Nutshell. Synthesis Journal, Section Four, 2008, pp. 89-108.

\* cited by examiner

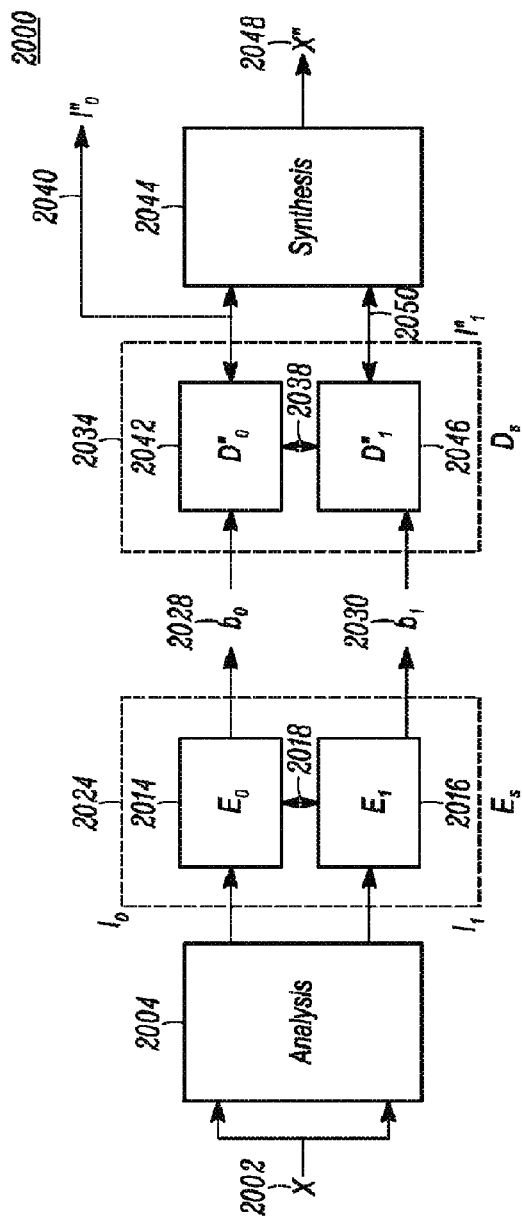
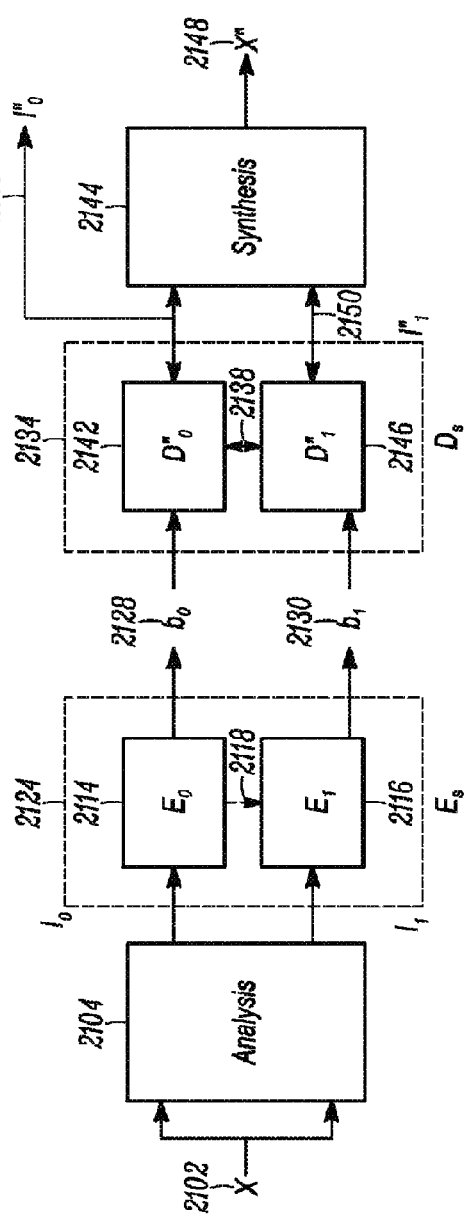

SCALABLE VIDEO CODING WITH ENHANCED BASE LAYER

CROSS-REFERENCE TO RELATED APPLICATION(S)

The present disclosure is a continuation of U.S. patent application Ser. No. 13/893,369, filed May 14, 2013, which is incorporated by reference herein in its entirety.

FIELD

The present disclosure is related generally to coding video streams and, more particularly, to using information such as coding parameters and reconstructed data to improve the performance of one or more layers.

BACKGROUND

Many video compression techniques, e.g., MPEG-2 and MPEG-4 Part 10/AVC, use block-based motion compensated transform coding. These approaches attempt to adapt block size to content for spatial and temporal prediction, with DCT transform coding of the residual. Although efficient coding can be achieved, limitations on block size and blocking artifacts can often affect performance. What is needed is a framework that allows for coding of the video that can be better adapted to the local image content for efficient coding and improved visual perception.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 20 illustrates the decomposition of an input x into two layers through analysis filtering according to some embodiments of the disclosure; and FIG. 21 illustrates the decomposition of an input x into two layers through analysis filtering according to some embodiments of the disclosure.

DETAILED DESCRIPTION

Figure 1:
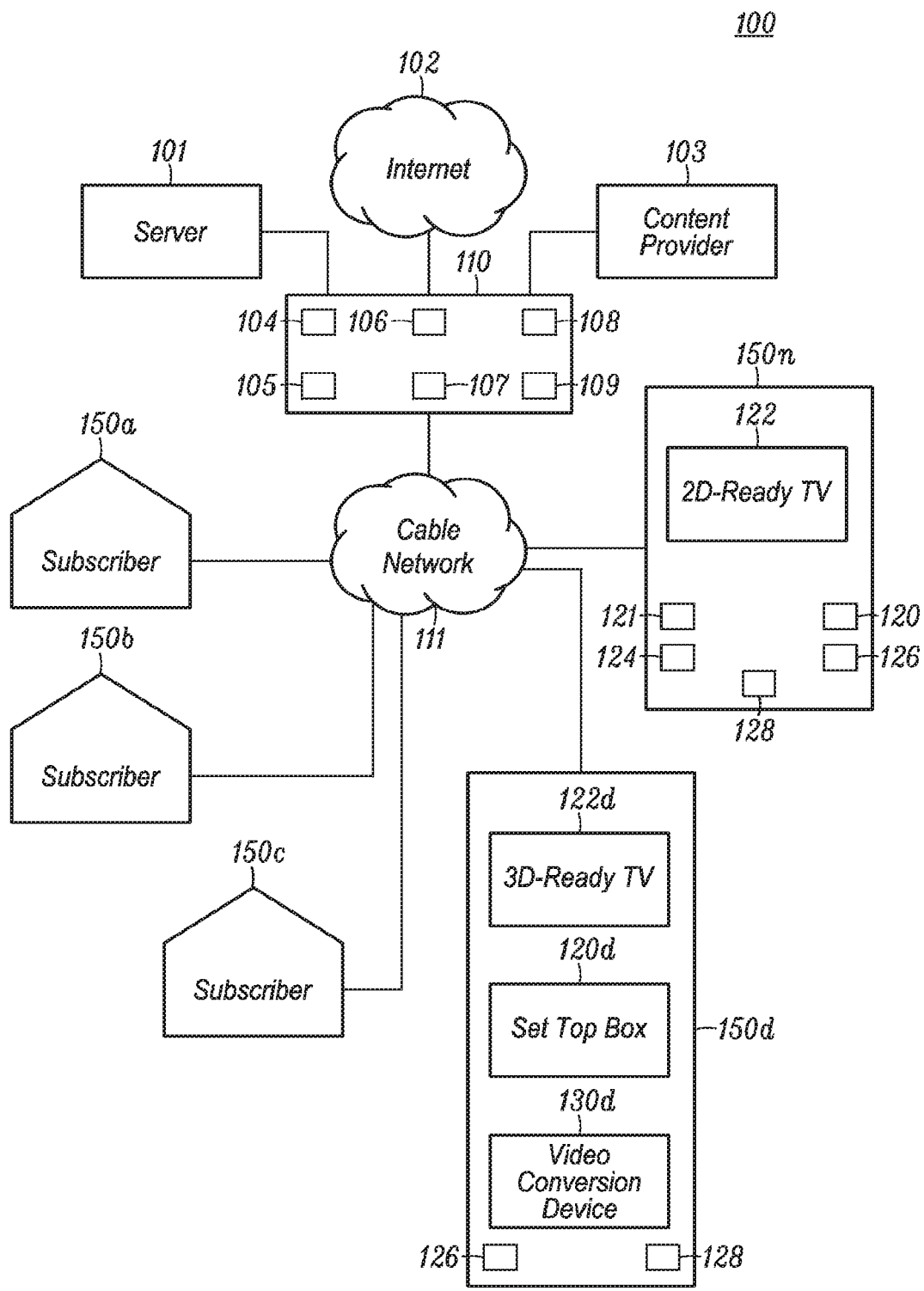
FIG. 1 is an example of a network architecture that is used by some embodiments of the disclosure.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

There is provided herein a method and apparatus for using information such as coding parameters and reconstructed data to improve the performance of one or more layers.

In a first aspect, a method comprises: (a) receiving a layer 0 bitstream, the layer 0 bitstream including coding information for the layer 0 bitstream; (b) receiving a layer 1 bitstream, the layer 1 bitstream including coding information for the layer 1 bitstream; and (c) reconstructing the layer 0 bitstream using previously received information for another layer 0 bitstream and previously received information for another layer 1 bitstream.

In a second aspect, an apparatus is disclosed comprising: an encoder configured to encode a layer 0 bitstream and a layer 1 bitstream, wherein the layer 0 bitstream includes coding information for the layer 0 bitstream and wherein the layer 1 bitstream includes coding information for the layer 1 bitstream; and wherein the encoder encodes the layer 0 bitstream using only previously received information for another layer 0 bitstream or encodes the layer 0 bitstream using previously received information from another layer 0 bitstream and previously received information for another layer 1 bitstream.

In accordance with the description, the principles described are directed to an apparatus operating at a headend of a video distribution system and a divider to segment an input video stream into partitions for each of a plurality of channels of the video. The apparatus also includes a channel analyzer coupled to the divider wherein the channel analyzer decomposes the partitions and an encoder coupled to the channel analyzer to encode the decomposed partitions into an encoded bitstream wherein the encoder receives coding information from at least one of the plurality of channels to be used in encoding the decomposed partitions into the encoded bitstream. In an embodiment, the apparatus includes a reconstruction loop to decode the encoded bitstream and recombine the decoded bitstreams into a reconstructed video stream and a buffer to store the reconstructed video stream. In another embodiment, the buffer also can store other coding information from other channels of the video stream. In addition, the coding information includes at least one of the reconstructed video streams and coding information used for the encoder and the coding information is at least one of reference picture information and coding information of video stream. Moreover, the divider uses at least one of a plurality of feature sets to form the partitions. In an embodiment the reference picture information is determined from reconstructed video stream created from the bitstreams.

In another embodiment, an apparatus is disclosed that includes a decoder that receives an encoded bitstream wherein the decoder decodes the bitstream according to received coding information regarding channels of the encoded bitstream. The apparatus also includes a channel synthesizer coupled to the decoder to synthesize the decoded bitstream into partitions of a video stream and a combiner coupled to the channel synthesizer to create a reconstructed video stream from the decoded bitstreams. The coding information can include at least one of the reconstructed video stream and coding information for the reconstructed video stream. In addition, the apparatus includes a buffer coupled to the combiner wherein the buffer stores the reconstructed video stream. A filter can couple between the buffer and decoder to feed back at least a part of the reconstructed video stream to the decoder as coding information. The partitions can also be determined based on at least one of a plurality of feature sets of the reconstructed video stream.

In addition, the principles described disclose a method that includes receiving an input video stream and partitioning the input video stream into a plurality of partitions. The method also includes decomposing the plurality of partitions and encoding the decomposed partitions into an encoded bitstream wherein the encoding uses coding information from channels of the input video stream. In an embodiment, the method further includes receiving a reconstructed video stream derived from the encoded bitstreams as an input used to encode the partitions into the bitstream. Moreover, the method can include buffering a reconstructed video stream reconstructed from the encoded bitstreams to be used as coding information for other channels of the input video stream. The coding information can be at least one of reference picture information and coding information of the video stream.

Another method is also disclosed. This method includes receiving at least one encoded bitstream and decoding the received bitstream wherein the decoding uses coding information from channels of an input video stream. In addition, the method synthesizes the decoded bitstream into a series of partitions of the input video stream and combines the partitions into a reconstructed video stream. In an embodiment, the coding information is at least one of reference picture information and coding information of the input video stream. Furthermore, the method can include using the reconstructed video stream as input for decoding the bitstreams and synthesizing the reconstructed video stream for decoding the bitstream.

The present description is developed based on the premise that each area of a picture in a video stream is most efficiently described with a specific set of features. For example, a set of features can be determined for the parameters that efficiently describes a face for a given face model. In addition, the efficiency of a set of features that describe a part of an image depends on the application (e.g., perceptual relevance for those applications where humans are the end users) and efficiency of the compression algorithm used in encoding for minimum description length of those features.

The proposed video codec uses N sets of features, named $\{FS_1, \ldots FS_N\}$, where each $FS_i$ consists of $n_i$ features named $\{f_i(1) \ldots f_i(n_i)\}$. The proposed video codec efficiently (e.g., based on some Rate-Distortion aware scheme) divides each picture into P suitable partitions that can be overlapped or disjoint. Next, each partition j is assigned one set of features which optimally describes that partition, e.g., $FS_i$. Finally, the value associated with each of the $n_i$ features in the $FS_i$ feature set to describe the data in partition j, would be encoded/compressed and sent to the decoder. The decoder reconstructs each feature value and then reconstructs the partition. The plurality of partitions will form the reconstructed picture.

In an embodiment, a method is performed that receives a video stream that is to be encoded and transmitted or stored in a suitable medium. The video stream comprises a plurality of pictures that are arranged in a series. For each of the plurality of pictures, the method determines a set of features for the picture and divides each picture into a plurality of partitions. Each partition corresponds to at least one of the features that describe the partition. The method encodes each partition according to an encoding scheme that is adapted to the feature that describes the partition. The encoded partitions can then be transmitted or stored.

It can be appreciated that a suitable method of decoding is performed for a video stream that is received using feature-based encoding. The method determines from the received video stream the encoded partitions. From each received partition it is determined from the encoding method used the feature used to encode each partition. Based on the determined features, the method reconstructs the plurality of partitions used to create each of the plurality of pictures in the encoded video stream.

In an embodiment, each feature coding scheme might be unique to that specific feature. In another embodiment, each feature coding scheme may be shared for coding of a number of different features. The coding schemes can use spatial, temporal, or coding information across the feature space for the same partition to optimally code any given feature. If the decoder depends on such spatial, temporal, or cross feature information, it must come from already transmitted and decoded data.

Turning to FIG. 1, there is illustrated a network architecture 100 that encodes and decodes a video stream according to features found in the pictures of the video stream. Embodiments of the encoding and decoding are described in more detail below. As shown in FIG. 1, the network architecture 100 is illustrated as a cable television network architecture 100, including a cable headend unit 110 and a cable network 111. It is understood, however, that the concepts described here are applicable to other video streaming embodiments including other wired and wireless types of transmission. A number of data sources 101, 102, 103 may be communicatively coupled to the cable headend unit 110 including, but in no way limited to, a plurality of servers 101, the Internet 102, radio signals, or television signals received via a content provider 103. The cable headend 110 is also communicatively coupled to one or more subscribers 150 *a-n* through the cable network 111.

The cable headend 110 includes the necessary equipment to encode the video stream that it receives from the data sources 101, 102, 103 according to the various embodiments described below. The cable headend 110 includes a feature-set device 104. The feature-set device 104 stores the various features, described below, that are used to partition the video stream. As features are determined, the qualities of the features are stored in the memory of the feature-set device 104. The cable headend 110 also includes a divider 105 that divides the video stream into a plurality of partitions according to the various features of the video stream determined by the feature-set device 104.

The encoder 106 encodes the partitions using any of a variety of encoding schemes that are adapted to the features that describe the partitions. In an embodiment, the encoder is capable of encoding the video stream according to any of a variety of different encoding schemes. The encoded partitions of the video stream are provided to the cable network 111 and transmitted using transceiver 107 to the various subscriber units 150 a-n. In addition, a processor 108 and memory 109 are used in conjunction with the feature-set device 104, divider 105, encoder 106, and transceiver 107 as a part of the operation of cable headend 110.

The subscriber units 150 a-n can be 2D-ready TVs 150 n or 3D ready TVs 150d. In an embodiment, the cable network 111 provides the 3D- and 2D-video content stream to each of the subscriber units 150 a-n using, for instance, fixed optical fibers or coaxial cables. The subscriber units 150 a-n each includes a set top box ("STB") 120, 120 d that receives the video content stream that is using the feature-based principles described. As is understood, the subscriber units 150 a-n can include other types of wireless or wired transceivers that are capable of transmitting and receiving video streams and control data from the headend 110. The subscriber unit 150 d may have a 3D-ready TV component 122 d capable of displaying 3D stereoscopic views. The subscriber unit 150 n has a 2D TV component 122 that is capable of displaying 2D views. Each of the subscriber units 150 a-n includes a combiner 121 that receives the decoded partitions and recreates the video stream. In addition, a processor 126 and memory 128, as well as other components not shown, are used in conjunction with the STB and the TV components 122, 122 d as part of the operation of the subscriber units 150a-n.

As mentioned, each picture in the video stream is partitioned according to the various features found in the pictures. In an embodiment, the rules by which a partition is decomposed or analyzed for encoding and reconstructed or synthesized for decoding are based on a set of fixed features that are known by both encoder and decoder. These fixed rules are stored in the memories 109, 128 of the headend device 110 and the subscriber units 150a-n, respectively. In this embodiment, there is no need to send any information from the encoder to the decoder on how to reconstruct the partition in this class of fixed feature-based video codecs. In this embodiment, the encoder 106 and the decoders 124 are configured with the feature sets used to encode/decode the various partitions of the video stream.

In another embodiment, the rules by which a partition is decomposed or analyzed for encoding and reconstructed or synthesized for decoding is based on a set of features that is set by the encoder 106 to accommodate more efficient coding of a given partition. The rules that are set by the encoder 106 are adaptive reconstruction rules. These rules need to be sent from the headend 110 to the decoder 124 at the subscriber units 150 a-n.

Figure 2:
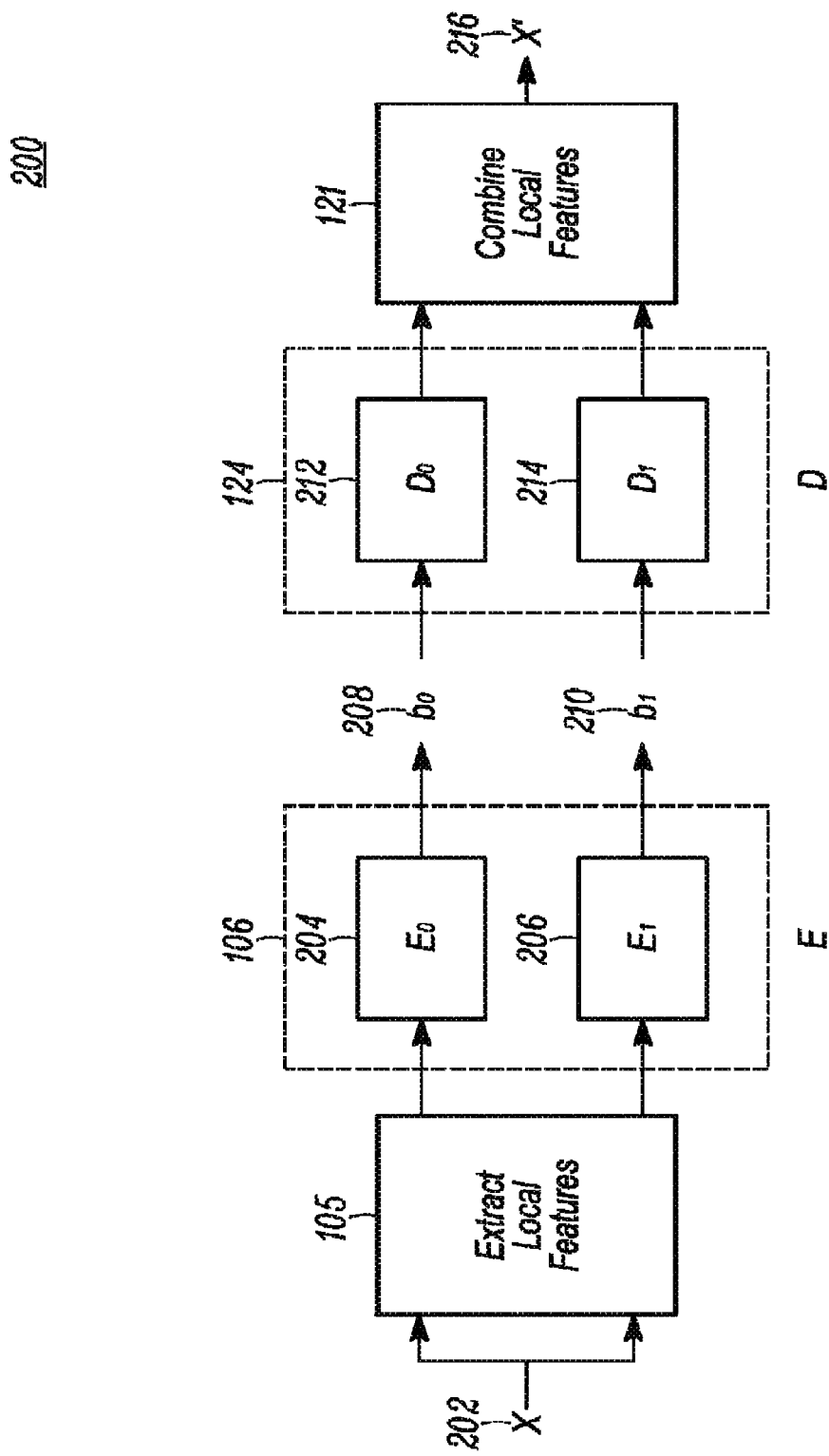
FIG. 2 is a diagram of an encoder/decoder used in accordance with some embodiments of the disclosure.

FIG. 2 is a high-level diagram 200 where the input video signal x 202 is decomposed into two sets of features by a feature-set device 104. The pixels from the input video x 202 can be categorized by features such as motion (e.g., low, high), intensity (bright, dark), texture, pattern, orientation, shape, and other categories based on the content, quality, or context of the input video x 202. The input video signal x 202 can also be decomposed by spatiotemporal frequency, signal vs. noise, or by using some image model. In addition, the input video signal x 202 can be decomposed using a combination of any of the different categories. Since the perceptual importance of each feature can differ, each one can be more appropriately encoded by encoder 106 with one or more of the different encoders $E_i$ 204, 206 using different encoder parameters to produce bitstreams $b_i$ 208, 210. The encoder E 106 can also make joint use of the individual feature encoders $E_i$ 204, 206.

The decoder D 124, which includes decoders 212, 214, reconstructs the features from the bitstreams $b_i$ 208, 210 with possible joint use of information from all the bitstreams being sent between the headend 110 and the subscriber units 105 a-n. The features are combined by combiner 121 to produce the reconstructed output video signal x' 216. As can be understood, output video signal x' 216 corresponds to the input video signal x 202.

Figure 3:
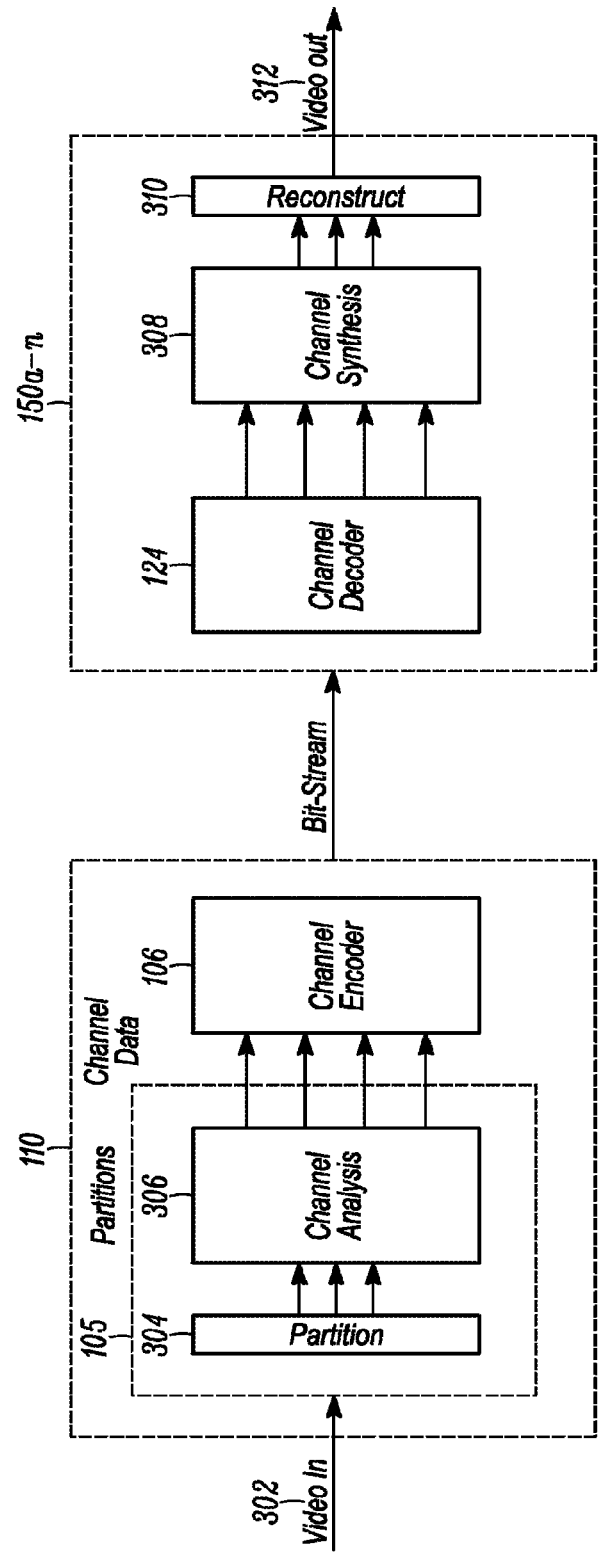
FIG. 3 is a diagram of an encoder/decoder used in accordance with some embodiments of the disclosure.

More specifically, FIG. 3 shows a diagram of the proposed High-Efficiency Video Coding ("HVC") approach. For example, the features used as a part of HVC are based on spatial-frequency decomposition. It is understood, however, that the principles described for HVC can be applied to features other than spatial-frequency decomposition. As shown, an input video signal x 302 is provided to the divider 105, which includes a partitioning module 304 and a channel-analysis module 306. The partitioning module 304 is configured to analyze the input video signal x 302 according to a given feature set, e.g., spatial frequency, and divide or partition the input video signal x 302 into a plurality of partitions based on the feature set. The partitioning of the input video signal x 302 is based on the rules corresponding to the given feature set. For example, since the spatial frequency content varies within a picture, each input picture is partitioned by the partitioning module 304 so that each partition can have different spatial-frequency decomposition so that each partition has a different feature set.

For example, in the channel-analysis module 306, an input video partition can be decomposed into 2×2 bands based on spatial frequency, e.g., low-low, low-high, high-low, and high-high for a total of four feature sets or into 2×1 (vertical) or 1×2 (horizontal) frequency bands which requires two features (H & L frequency components) for these two feature sets. These sub-bands or "channels" can be coded using spatial prediction, temporal prediction, and cross-band prediction, with an appropriate sub-band specific objective or perceptual quality metric (e.g., mean square error ("MSE") weighting). Existing codec technology can be used or adapted to code the bands using the channel encoder 106. The resulting bitstream of the encoded video signal partitions is transmitted to subscriber units 150 a-n for decoding. The channels decoded by decoder 124 are used for channel synthesis by module 308 to reconstruct the partitions by module 310 to thereby produce the output video signal 312.

Figure 4:
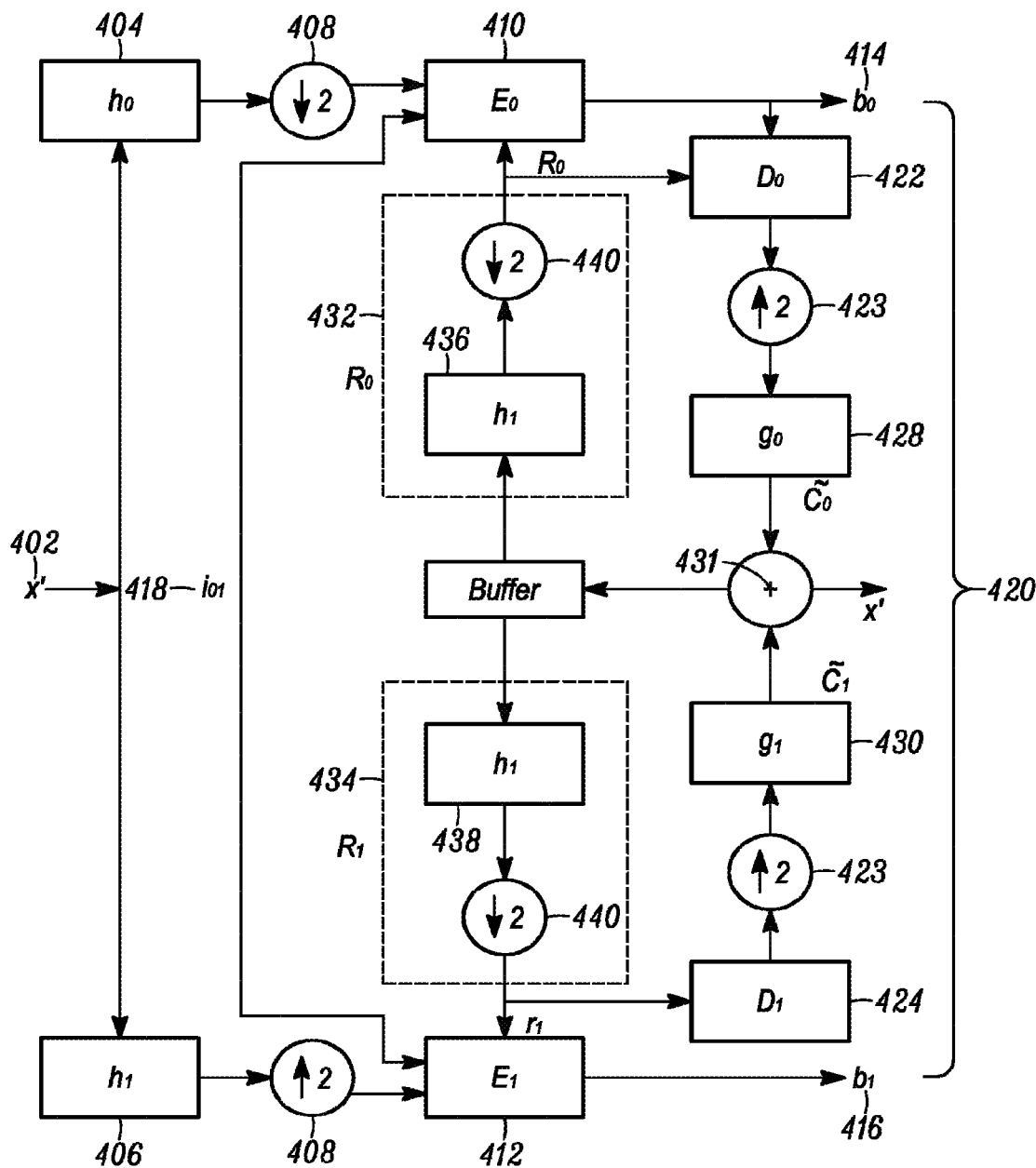
FIG. 4 is an illustration of an encoder incorporating some of principles of the disclosure.

An example of a two-channel HVC encoder 400 is shown in FIG. 4. The input video signal x 402 can be the entire image or a single image partition from the divider 105. The input video signal x 402 is filtered according to a function $h_i$ by filters 404, 406. It is understood that any number of filters can be used depending on the features set. In an embodiment, filtered signals are then sampled by sampler 408 by a factor corresponding to the number of filters 404, 406, e.g., two, so that the total number of samples in all channels is the same as the number of input samples. The input image or partition can be appropriately padded (e.g., using symmetric extension) in order to achieve the appropriate number of samples in each channel. The resulting channel data are then encoded by encoder $E_0$ 410 and $E_1$ 412 to produce the channel bitstream $b_0$ 414 and $b_1$ 416, respectively.

If the bit depth resolution of the input data to an encoder $E_i$ is larger than what the encoder can process, then the input data can be appropriately re-scaled prior to encoding. This re-scaling can be done through bounded quantization (uniform or non-uniform) of data which may include scaling, offset, rounding, and clipping of the data. Any operations performed before encoding (such as scaling and offset) should be reversed after decoding. The particular parameters used in the transformation can be transmitted to the decoder or agreed upon a priori between the encoder and decoder.

A channel encoder may make use of coding information $i_{01}$ 418 from other channels (channel k for channel j in the case of $i_{jk}$) to improve coding efficiency and performance. If $i_{01}$ is already available at the decoder there is no need to include this information in the bitstream, otherwise, $i_{01}$ is also made available to the decoder, described below, with the bitstreams. In an embodiment, the coding information $i_{jk}$ can be the information needed by the encoders or decoders or it can be predictive information based on analysis of the information and the channel conditions. The reuse of spatial or temporal prediction information can be across a plurality of sub-bands determined by the HVC coding approach. Motion vectors from the channels can be made available to the encoders and decoders so that the coding of one sub-band can be used by another sub-band. These motion vectors can be the exact motion vector of the sub-band or predictive motion vectors. Any currently coded coding unit can inherit the coding mode information from one or more of the sub-bands which are available to the encoders and decoders. In addition, the encoders and decoders can use the coding mode information to predict the coding mode for the current coding unit. Thus, the modes of one sub-band can also be used by another sub-band.

In order to match the decoded output, the decoder reconstruction loop 420 is also included in the encoder, as illustrated by the bitstream decoder $D_i$ 422, 424. As a part of the decoder reconstruction loop 420, the decoded bitstreams 414, 416 are up-sampled by a factor of two by samplers 423, where the factor corresponds to the number of bitstreams, and are then post-filtered by a function $g_i$ by filters 428, 430. The filters $h_i$ 404, 406 and filters $g_i$ 428, 430 can be chosen so that when the post-filtered outputs are added by combiner 431, the original input signal x can be recovered as reconstructed signal x' in the absence of coding distortion. Alternatively, the filters $h_i$ 404, 406 and $g_i$ 428, 430 can be designed so as to minimize overall distortion in the presence of coding distortion.

FIG. 4 also illustrates how the reconstructed output x' can be used as a reference for coding future pictures as well as for coding information i for another channel k (not shown). A buffer 431 stores these outputs, which then can be filtered $h_i$ and decimated to produce picture $r_i$, and this is performed for both encoder $E_i$ and decoder $D_i$. As shown, the picture $r_i$ can be fed back to be used by both the encoder 410 as well as the decoder 422, which is a part of the reconstruction loop 420. In addition, optimization can be achieved using filters $R_i$ 432, 434, which filter and sample the output for the decoder reconstruction loop 420 using a filter function h 436, 438 and samplers 440. In an embodiment, the filters $R_i$ 432, 434 select one of several channel analyses (including the default with no decomposition) for each image or partition. However, once an image or partition is reconstructed, the buffered output can then be filtered using all possible channel analyses to produce appropriate reference pictures. As is understood, these reference pictures can be used as a part of the encoders 410, 412 and as coding information for other channels. In addition, although FIG. 4 shows the reference channels being decimated after filtering, it is also possible for the reference channels to be undecimated. While FIG. 4 shows the case of a two-channel analysis, the extension to more channels is readily understood from the principles described.

Sub-band reference picture interpolation can be used to provide information on what the video stream should be. The reconstructed image can be appropriately decomposed to generate reference sub-band information. The generation of sub-sampled sub-band reference data can be done using an undecimated reference picture that may have been properly synthesized. A design of a fixed interpolation filter can be used based on the spectral characteristics of each sub-band. For example, a flat interpolation is appropriate for high frequency data. On the other hand, adaptive interpolation filters can be based on MSE minimization that may include Wiener filter coefficients that apply to synthesized referenced frames that are undecimated.

Figure 5:
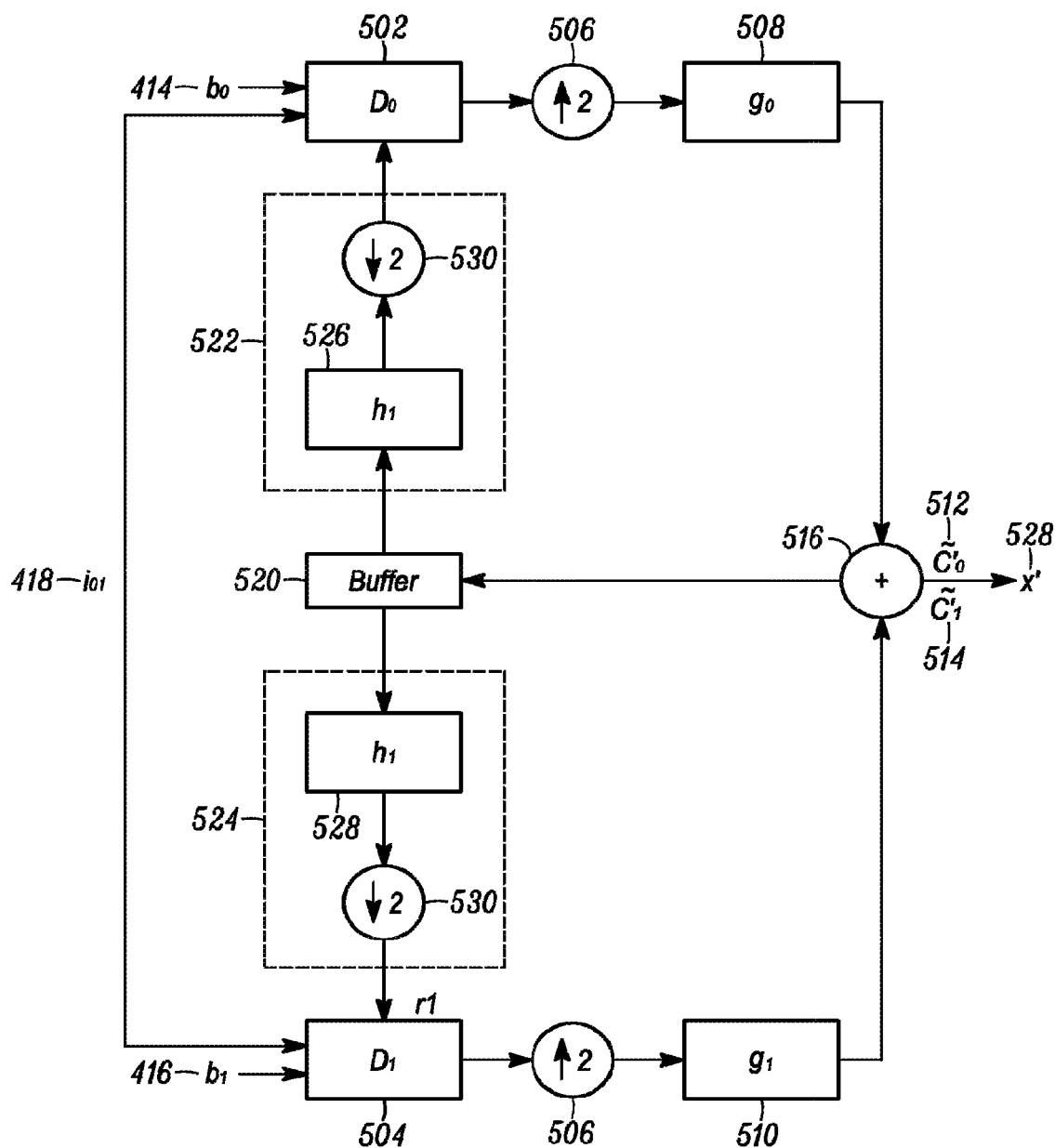
FIG. 5 is an illustration of a decoder corresponding to the encoder shown in FIG. 4.

FIG. 5 shows the corresponding decoder 500 to the encoder illustrated in FIG. 4. The decoder 500 operates on the received bitstreams $b_i$ 414, 416 and co-channel coding information i 418. This information can be used to derive or re-use coding information among the channels at both the encoder and decoder. The received bitstreams 414, 416 are decoded by decoders 502, 504 which are configured to match the encoders 410, 412. When encoding/decoding parameters are agreed to a priori, then decoders 502, 504 are configured with similar parameters. Alternatively, decoders 502, 504 receive parameter data as a part of the bitstreams 414, 416 so as to be configured corresponding to the encoders 410, 412. Samplers 506 are used to resample the decoded signal. Filters 508, 510 using a filter function $g_i$ are used to obtain a reconstructed input video signal x'. The output signals $\tilde{c}_0$ 512 and $\tilde{c}_1$ 514 from filters 508, 510 are added together by adder 516 to produce reconstructed input video signal x' 528.

As seen, the reconstructed video signal x' 528 is also provided to buffer 520. The buffered signal is supplied to filters 522, 524 that filter the reconstructed input signal by a function $h_i$ 526, 528 and then resample the signals using sampler 530. As shown, the filtered reconstruction input signal is fed back into decoders 502, 504.

Figure 6:
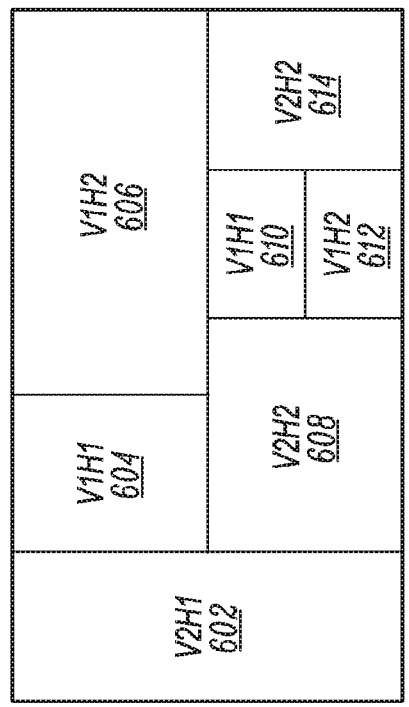
FIG. 6 is an illustration of a partitioned picture from a video stream in accordance with some embodiments of the disclosure.

As described above, an input video stream x can be divided into partitions by divider 105. In an embodiment, the pictures of an input video stream x are divided into partitions where each partition is decomposed using the most suitable set of analysis, sub-sampling, and synthesis filters (based on the local picture content for each given partition) where the partitions are configured having similar features from the feature set. FIG. 6 shows an example of a coding scenario which uses a total of four different decomposition choices using spatial-frequency decomposition as an example of the feature set used to adaptively partition, decompose, and encode a picture 600. Adaptive partitioning of pictures in a video stream can be described by one feature set FS that is based on a minimal feature description length criterion. As understood, other feature sets can be used. For spatial-frequency decomposition, the picture 600 is examined to determine the different partitions where similar characteristics can be found. Based on the examination of the picture 600, partitions 602-614 are created. As shown, the partitions 602-614 are not overlapping with one another, but it is understood that the edges of partitions 602-614 can overlap.

In the example of spatial-frequency decomposition, the feature set options are based on vertical or horizontal filtering and sub-sampling. In one example, designated as $V_1H_1$, used in partitions 604, 610 as an example, the pixel values of the partition are coded: This feature set has only one feature, which are the pixel values of the partition. This is equivalent of the traditional picture coding, where the encoder and decoder operate on the pixel values. As shown, partitions 606, 612, which are designated by $V_1H_2$, are horizontally filtered and sub-sampled by a factor of two for each of the two sub-bands. This feature set has two features. One is the value of the low frequency sub-band and the other is the value of the high frequency sub-band. Each sub-band is then coded with an appropriate encoder. In addition, partition 602, which is designated by $V_2H_1$, is filtered using a vertical filter and sub-sampled by a factor of two for each of the two sub-bands. Like partitions 606, 612 using $V_1H_2$, the feature set for partition 602 has two features. One is the value of the low frequency sub-band and the other is the value of the high frequency sub-band. Each sub-band can be coded with an appropriate encoder.

Partitions 608, 614, which are designated by $V_2H_2$, use separable or non-separable filtering and sub-sampling by a factor of two in each of the horizontal and vertical directions. As the filtering and sub-sampling is in two dimensions, the operation takes place for each of four sub-bands so that the feature set has four features. For example, in the case of a separable decomposition, the first feature captures the value of a low frequencies ("LL") sub-band, the second and third features capture the combination of low and high frequencies, i.e., "LH" and "HL" sub-band values, respectively, and the fourth feature captures the value of high frequencies ("HH") sub-band. Each sub-band is then coded with an appropriate encoder.

Divider 105 can use a number of different adaptive partitioning schemes to create the partitions 602-614 of each picture in an input video stream x. One category is rate distortion ("RD") based. One example of RD-based partition is a Tree-structured approach. In this approach, a partitioning map would be coded using a tree structure, e.g., quadtree. The tree branching is decided based on cost minimization that includes both the performance of the best decompositioning scheme as well as the required bits for description of the tree nodes and leaves. Alternatively, the RD-based partition can use a two pass approach. In the first pass, all partitions with a given size would go through adaptive decompositioning to find the cost of each decompositioning choice, then the partitions from the first pass would be optimally merged to minimize the overall cost of coding the picture. In this calculation, the cost of transmission of the partitioning information can also be considered. In the second pass the picture would be partitioned and decomposed according to the optimal partition map.

Another category of partition is non-RD-based. In this approach Norm-p Minimization is utilized: In this method, a norm-p of the sub-band data for all channels of the same spatial locality would be calculated for each possible choice of decompositioning. Optimal partitioning is realized by optimal division of the picture to minimize the over norm-p at all partitions 602-614. Also in this method, the cost of sending the partitioning information is considered by adding the suitably weighted bit-rate (either actual or estimated) to send the partitioning information to the overall norm-p of the data. For pictures with natural content a norm-1 is generally used.

The adaptive sub-band decomposition of a picture or partition in video coding is described above. Each decomposition choice is described by the level of sub-sampling in each of horizontal and vertical directions, which in turn defines the number and size of sub-bands. e.g., $V_1H_1$, $V_1H_2$, etc. As understood, the decomposition information for a picture or partition can be reused or predicted by sending the residual increment for a future picture or partition. Each sub-band is derived by application of analysis filters, e.g., filters $h_i$ 404, 406, before compression and reconstructed by application of a synthesis filters, e.g., filters $g_i$ 428, 430, after proper upsampling. In the case of cascading the decomposition, there might be more than one filter involved to analyze or synthesize each band.

Returning to FIGS. 4 and 5, filters 404, 406, 428, 430, 436, 438, 508, 510, 522, 524 can be configured and designed to minimize the overall distortion and as adaptive synthesis filters ("ASF"). In ASF, filters are attempting to minimize the distortion caused by the coding of each channel. The coefficients of the synthesis filter can be set based on the reconstructed channels. One example of ASF is based on joint sub-band optimization. For a given size of the function of $g_i$, the Linear Mean Square Estimation technique can be used to calculate the coefficients of $g_i$ such that the mean square estimate error between the final reconstructed partition x' and the original pixels in the original signal x in the partition is minimized. In an alternative embodiment, independent channel optimization is used. In this example, the joint sub-band optimization requires the auto- and cross-correlations between the original signal x and the reconstructed sub-band signals after upsampling. Furthermore, a system of matrix equations can be solved. The computation associated with this joint sub-band optimization might be prohibitive in many applications.

Figure 7:
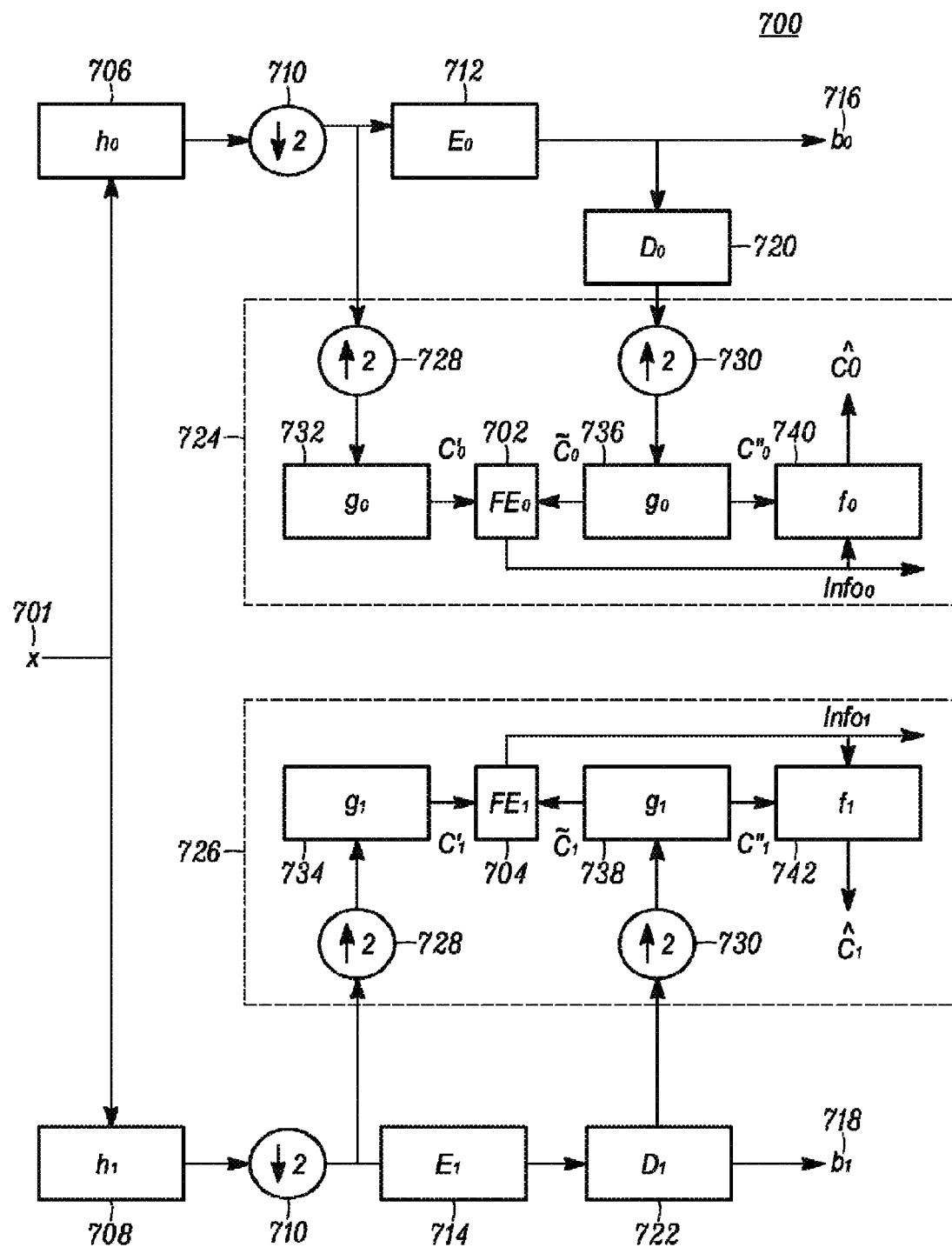
FIG. 7 is an illustration of an encoder incorporating some of the principles of the disclosure.

An example of independent channel optimization solution for an encoder 700 can be seen in FIG. 7, which focuses on the ASF so the reference picture processing using filters 432 and 434 shown in FIG. 4 are omitted. In ASF, filter estimation modules ($FE_i$) 702, 704 are provided to perform filter estimation between the decoded reconstructed channel $\{\tilde{c}\}_i$, which is generally noisy, and the unencoded reconstructed channel $c'_i$ which is noiseless. As shown, an input video signal x 701 is split and provided to filters 706, 708 that filter the signal x according to the known function $h_i$ and then sampled using samplers 710 at a rate determined by the number of partitions. In an embodiment of two channel decomposition, one of the filters 706, 708 can be a low pass filter and the other can be a high pass filter. It is understood, the partitioning the data in a two-channel decomposition doubles the data. Thus, the samplers 710 can critically sample the input signals to half the amount of data so that the same number of samples are available to reconstruct the input signal at the decoder. The filtered and sampled signal is then encoded by encoders $E_i$ 712, 714 to produce bitstreams $b_i$ 716, 718. The encoded bitstreams $b_i$ 716, 718 are provided to decoders 720, 722.

Encoder 700 is provided with an interpolation module 724, 726 that receives a signal filtered and sampled signal provided to the encoders 712, 714 and from decoder 720, 722. The decimated and sampled signal and the decoded signal are sampled by samplers 728, 730. The resampled signals are processed by filters 732, 734 to produce signal $c'_i$ while the decoded signals are also processed by filters 736, 738 to produce signal $\{\tilde{c}\}_i$. The signals $c'_i$ and $\{\tilde{c}\}_i$ are both provided to the filter estimation modules 702, 704 described above. The output of the filter estimation modules 702, 704 corresponds to the filter information $info_i$ of the interpolation module 724, 726. The filter information $info_i$ can also be provided to the corresponding decoder as well as to other encoders.

The interpolation module can also be configured with a filter 740, 742 utilizing a filter function $f_i$. The filter 740, 742 can be derived to minimize an error metric between $c'_i$ and $\{\tilde{c}\}_i$ and this filter is applied to $c''_i$ to generate $\hat{c}_i$. The resulting filtered channel outputs $\hat{c}_i$ are then combined to produce the overall output. In an embodiment, the ASF outputs $\hat{c}_i$ can be used to replace $\{\tilde{c}\}_i$ in FIG. 4. Since the ASF is applied to each channel before combining, the ASF filtered outputs $c_i$ can be kept at a higher bit-depth resolution relative to the final output bit-depth resolution. That is, the combined ASF outputs can be kept at a higher bit-depth resolution internally for purposes of reference picture processing, while the final output bit-depth resolution can be reduced, for example, by clipping and rounding. The filtering performed by the interpolation module 740, 742 can fill in information that may be discarded by the sampling conducted by samplers 710. In an embodiment, the encoders 712, 714 can use different parameters based on the features set used to partition the input video signals and then to encode signals.

Figure 8:
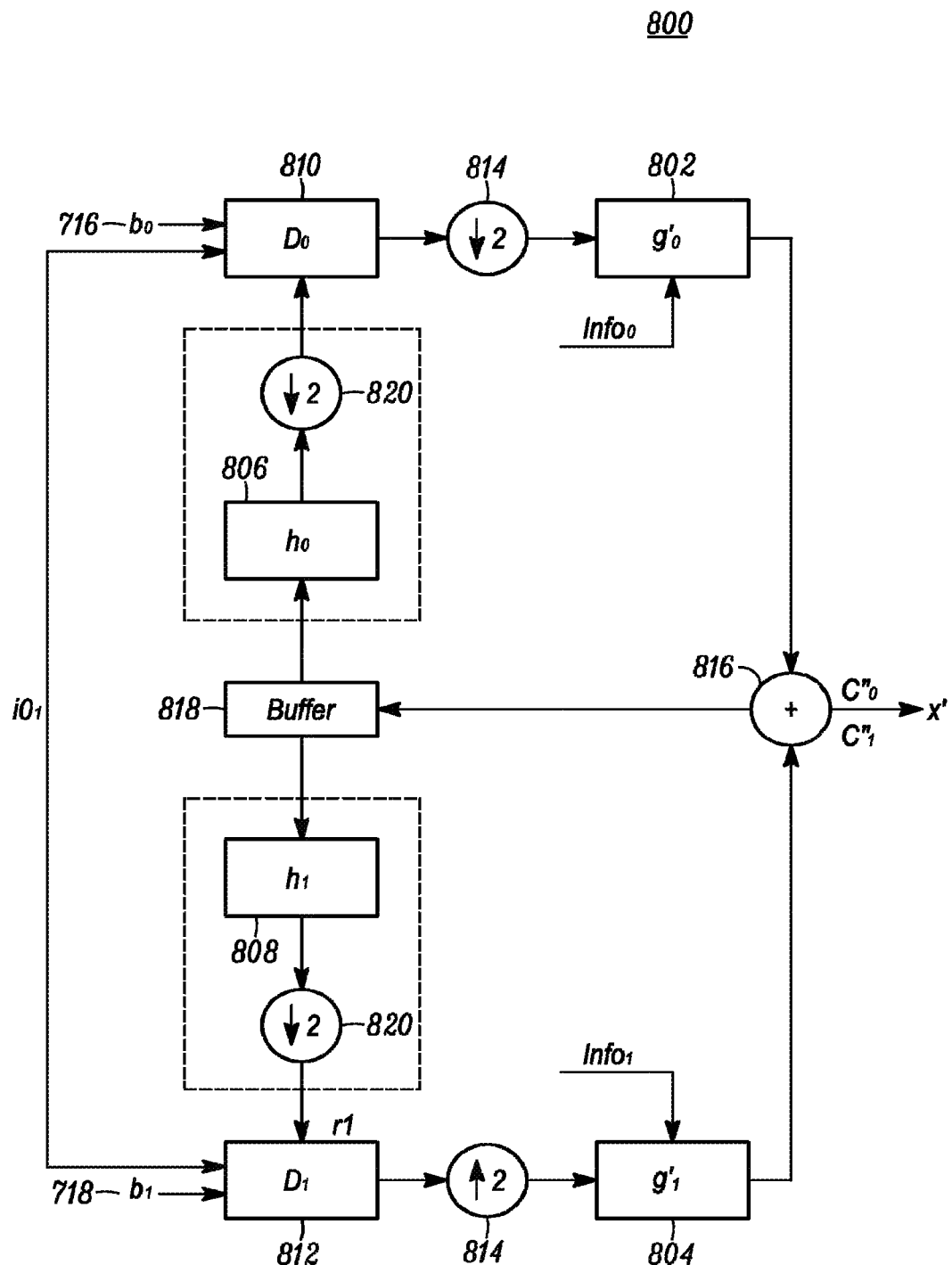
FIG. 8 is an illustration of a decoder corresponding to the encoder shown in FIG. 7.

The filter information $i_i$ can be transmitted to the decoder 800, which is shown in FIG. 8. The modified synthesis filters 802, 804 $g_i'$ can be derived from the functions $g_i$ and $f_i$ of filters 706, 708, 732-738 so that both encoder 700 and decoder 800 perform equivalent filtering. In ASF, the synthesis filters 732-738 $g_i$ are modified to $g_i'$ in filters 802, 804 to account for the distortions introduced by the coding. It is also possible to modify the analysis filter functions $h_i$ from filters 706, 708 to $h_i'$ in filters 806, 808 to account for coding distortions in adaptive analysis filtering ("AAF"). Simultaneous AAF and ASF is also possible. ASF/AAF can be applied to the entire picture or to picture partitions, and a different filter can be applied to different partitions. In an example of AAF, the analysis filter, e.g., 9/7, 3/5, etc., can be selected from a set of filter banks The filter that is used is based on the qualities of the signal coming into the filter. The coefficients of the AAF filter can be set based on the content of each partition and coding condition. In addition, the filters can be used for generation of sub-band reference data, in case the filter index or coefficients can be transmitted to the decoder to prevent a drift between the encoder and the decoder.

As seen in FIG. 8, bitstreams $b_i$ 716, 718 are supplied to decoders 810, 812 which have complementary parameters to encoders 712, 714. Decoders 810, 812 also receive as inputs coding information $i_i$ from the encoder 700 as well as from other encoders and decoders in the system. The output of decoders 810, 812 are resampled by samplers 814 and supplied to the filters 802, 804 described above. The filtered decoded bitstreams $c''_i$ are combined by the combiner 816 to produce reconstructed video signal x'. The reconstructed video signal x' can also be buffered in buffer 818 and processed by filters 806, 808 and sampled by samplers 820 to be supplied as feedback input to the decoders 810, 812.

The codecs shown in FIGS. 4, 5, 7, and 8 can be enhanced for HVC. In an embodiment, cross sub-band prediction can be used. For coding a partition with multiple sub-band feature sets, the encoder and the decoder can use the coding information from all the sub-bands that are already decoded and available at the decoder without the need to send any extra information. This is shown by the input of coding information provided to the encoders and decoders. An example of this is the re-use of temporal and spatial predictive information for the co-located sub-bands which are already decoded at the decoder. The issue of cross-band prediction is an issue related to the encoder and the decoder.

A few schemes which can be used to perform this task in the context of contemporary video encoders and decoders are now described.

One such scheme uses cross sub-band motion-vector prediction. Since the motion vectors in corresponding locations in each of the sub-bands point to the same area in the pixel domain of the input video signal x and therefore for the various partitions of x, it is beneficial to use the motion vectors from already coded sub-bands blocks at the corresponding location to derive the motion vector for the current block. Two extra modes can be added to the codec to support this feature. One mode is the re-use of motion vectors. In this mode the motion vector used for each block is directly derived from all the motion vectors of the corresponding blocks in the already transmitted sub-bands. Another mode uses motion-vector prediction. In this mode the motion vector used for each block is directly derived by adding a delta motion vector to the predicted motion vector from all the motion vectors of the corresponding blocks in the already transmitted sub-bands.

Another scheme uses cross sub-band coding mode prediction. Since the structural gradients such as edges in each image location taken from a picture in the video stream or from a partition of the picture can be spilled to corresponding locations in each of the sub-bands, it is beneficial for coding of any given block to re-use the coding mode information from the already coded sub-band blocks at the corresponding location. For example, in this mode the prediction mode for each macroblock can be derived from the corresponding macroblock of the low frequency sub-band.

Another embodiment of codec enhancement uses reference picture interpolation. For purposes of reference picture processing, the reconstructed pictures are buffered as seen in FIGS. 4 and 5 and are used as references for the coding of future pictures. Since the encoder $E_i$ operates on the filtered/decimated channels, the reference pictures are likewise filtered and decimated by reference picture process $R_i$ performed by filters 432, 434. However, some encoders may use higher subpixel precision, and the function $R_i$ is typically interpolated as shown in FIGS. 9(a) and 9(b) for the case of quarter-pel resolution.

Figure 9A:
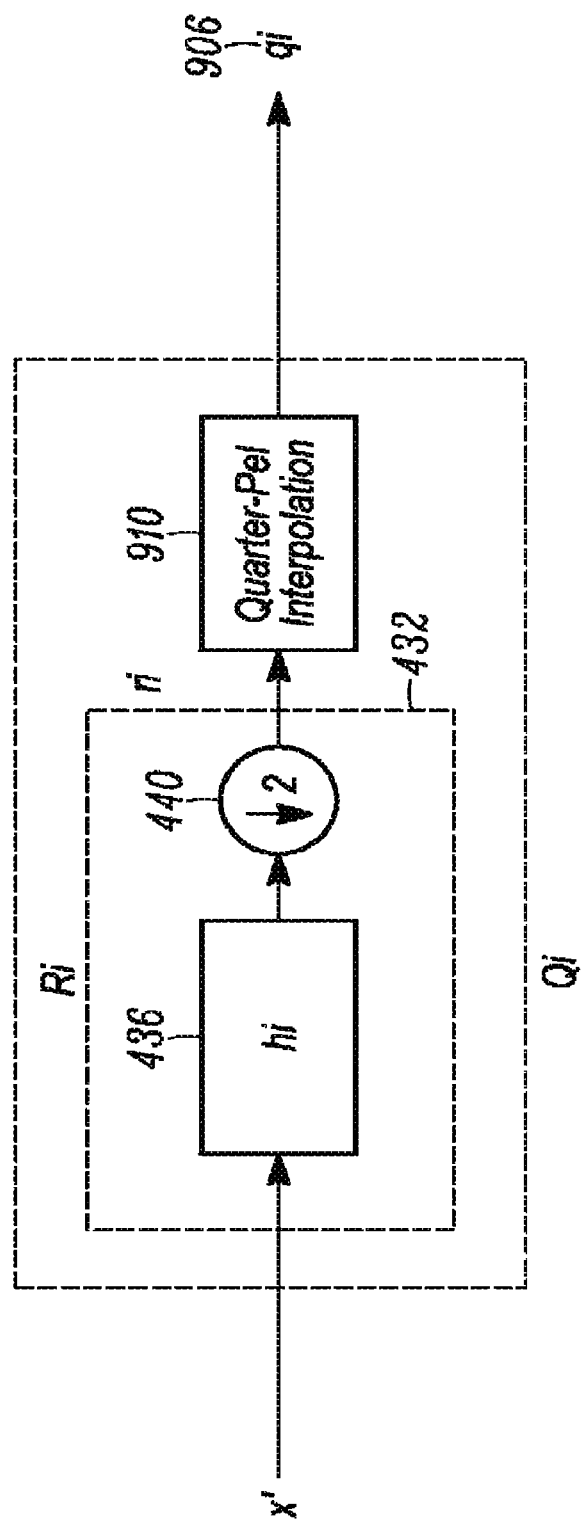
FIGS. 9(*a*) and 9(*b*) are illustrations of interpolation modules incorporating some of the principles of the disclosure.
Figure 9B:
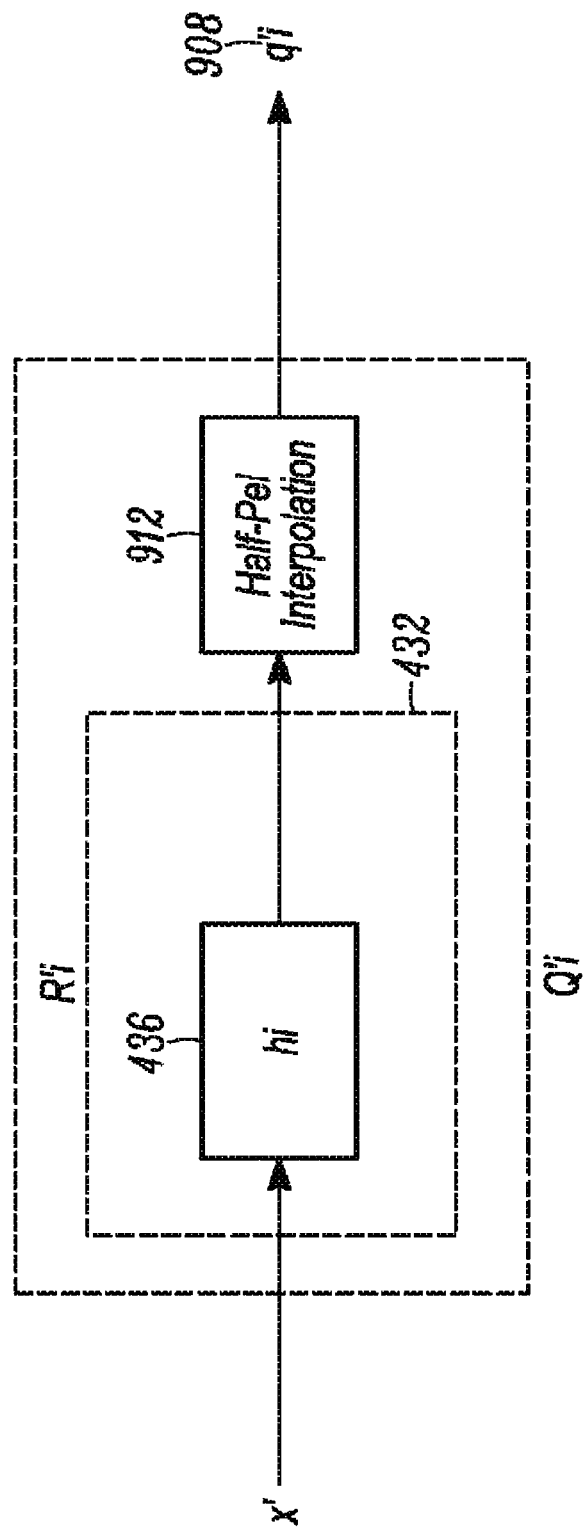

In FIGS. 9(a) and 9(b), the reconstructed input signals x' from are provided to the filter $Q_i$ 902 and $Q'_i$ 904. As seen in FIG. 9(a), the reference picture processing operation by filter $R_i$ 432 uses filter $h_i$ 436 and decimates the signal using sampler 440. The interpolation operation typically performed in the encoder can be combined in the filter's $Q_i$ 902 operation using the quarter-pel interpolation module 910. This overall operation generates quarter-pel resolution reference samples q, 906 of the encoder channel inputs. Alternatively, another way to generate the interpolated reference picture $q_i'$ is shown in FIG. 9(b). In this "undecimated interpolation" $Q_i'$, the reconstructed output is only filtered in $R_i'$ using filter $h_i$ 436 and not decimated. The filtered output is then interpolated by half-pel using the half-pel interpolation module 912 to generate the quarter-pel reference picture $q_i'$ 908. The advantage of $Q_i'$ over $Q_i$ is that $Q_i'$ has access to the "original" (undecimated) half-pel samples, resulting in better half-pel and quarter-pel sample values. The $Q_i'$ interpolation can be adapted to the specific characteristics of each channel i, and it can also be extended to any desired subpixel resolution.

As is understood from the foregoing, each picture, which in series make up the input video stream x, can be processed as an entire picture or partitioned into smaller contiguous or overlapping sub-pictures as seen in FIG. 6. The partitions can have fixed or adaptive size and shape. The partitions can be done at the picture level or adaptively. In an adaptive embodiment, the picture can be segmented into partitions using any of a number of different methods including a tree structure or a two-pass structure where the first path uses fixed blocks and the second pass works on merging blocks.

In decomposition, the channel analysis and synthesis can be chosen depending on content of the picture and video stream. For the example of filter-based analysis and synthesis, the decomposition can take on any number of horizontal and vertical bands, as well as multiple levels of decomposition. The analysis/synthesis filters can be separable or non-separable, and they can be designed to achieve perfect reconstruction in the lossless coding case. Alternatively, for the lossy coding case, they can be jointly designed to minimize the overall end-to-end error or perceptual error. As with the partitioning, each picture or sub-picture can have a different decomposition. Examples of such decomposition of the picture or video stream are filter-based, feature-based, content based such as vertical, horizontal, diagonal, features, multiple levels, separable and non-separable, perfect reconstruction ("PR") or not PR, and picture and sub-picture adaptive methods.

For coding by the encoders $E_i$ of the channels, existing video coding technologies can be used or adapted. In the case of decomposition by frequency, the low frequency band may be directly coded as a normal video sequence since it retains many properties of the original video content. Because of this, the framework can be used to maintain "backward compatibility" where the low band is independently decoded using current codec technology. The higher bands can be decoded using future developed technology and used together with the low band to reconstruct at a higher quality. Since each channel or band may exhibit different properties from one another, specific channel coding methods can be applied. Interchannel redundancies can also be exploited spatially and temporally to improve coding efficiency. For example, motion vectors, predicted motion vectors, coefficient scan order, coding mode decisions, and other methods may be derived based upon one or more other channels. In this case, the derived values may need to be appropriately scaled or mapped between channels. The principles can be applied to any video codec, can be backward compatible (e.g., low bands), can be for specific channel coding methods (e.g., high bands), and can exploit interchannel redundancies.

For reference picture interpolation, a combination of undecimated half-pel samples, interpolated values, and adaptive interpolation filter ("AIF") samples for the interpolated positions can be used. For example, some experiments showed it may beneficial to use AIF samples except for high band half-pel positions, where it was beneficial to use the undecimated wavelet samples. Although the half-pel interpolation in Q' can be adapted to the signal and noise characteristics of each channel, a lowpass filter can be used for all channels to generate the quarter-pel values.

It is understood that some features can be adapted in the coding of channels. In an embodiment, the best quantization parameter is chosen for each partition/channel based on RD-cost. Each picture of a video sequence can be partitioned and decomposed into several channels. By allowing different quantization parameters for each partition or channel, the overall performance can be improved.

To perform optimal bit allocation amongst different sub-bands of the same partition or across different partitions, an RD minimization technique can be used. If the measure of fidelity is peak signal-to-noise ratio ("PSNR"), it is possible to independently minimize the Lagrangian cost (D+λ·R) for each sub-band when the same Lagrangian multiplier (λ) is used to achieve optimal coding of individual channels and partitions.

For the low frequency band that preserves most of the natural image content, its RD curve generated by a traditional video codec maintains a convex property, and a quantization parameter ("qp") is obtained by a recursive RD cost search. For instance, at the first step, RD costs at $qp_1=qp$, $qp_2=qp+\Delta$, $qp_3=qp-\Delta$ are calculated. The value of $qp_i$ (i=1, 2, or 3) that has the smallest cost is used to repeat the process where the new qp is set to $qp_i$. The RD costs at $qp_i=qp$, $qp_2=qp+\Delta/2$, $qp_3=qp-\Delta/2$ are then computed, and this is repeated until the qp increment $\Delta$ becomes 1.

For high frequency bands, the convex property no longer holds. Instead of the recursive method, an exhaustive search is applied to find the best qp with the lowest RD cost. The encoding process at different quantization parameters from $qp-\Delta$ to $qp+\Delta$ is then run.

For example, $\Delta$ is set to be 2 in the low frequency channel search, and this results in a 5× increase in coding complexity in time relative to the case without RD optimization at the channel level. For the high frequency channel search, $\Delta$ is set to be 3, corresponding to a 7× increase in coding complexity.

By the above method, an optimal qp for each channel is determined at the expense of multi-pass encoding and increased encoding complexity. Methods for reducing the complexity can be developed that directly assign qp for each channel without going through multi-pass encoding.

In another embodiment, lambda adjustment can be used for each channel. As mentioned above, the equal Lagrangian multiplier choice for different sub-bands will result in optimum coding under certain conditions. One such condition is that the distortions from all sub-bands are additive with equal weight in formation of the final reconstructed picture. This observation along with the knowledge that compression noise for different sub-bands go through different (synthesis) filters, with different frequency dependent gains, suggest that coding efficiency can be improved by assigning a different Lagrangian function for different sub-bands, depending on the spectral shape of compression noise and the characteristics of the filter. For example, this is done by assigning a scaling factor to the channel lambda, where the scaling factor can be an input parameter from the configuration file.

In yet another embodiment, picture type determination can be used. An advanced video coding ("AVC") encoder may not be very efficient in coding the high frequency sub-bands. Many microblocks ("MB") in HVC are intra-coded in predictive slices, including P and B slices. In some extreme cases, all of MBs in a predictive slice are intra-coded. Since the context model of the intra MB mode is different for different slice types, the generated bit rates are quite different when the sub-band is coded as an I slice, P slice, or a B slice. In other words, in natural images, the intra MBs are less likely to occur in a predictive slice. Therefore, a context model with a low intra MB probability is assigned. For I slices, a context model with a much higher intra MB probability is assigned. In this case, a predictive slice with all MBs intra-coded consumes more bits than an I slice even when every MB is coded at the same mode. As a consequence, a different entropy coder can be used for high frequency channels. Moreover, each sub-band can use a different entropy coding technique or coder based on the statistical characteristics of each sub-band. Alternatively, another solution is to code each picture in a channel with a different slice type and then choose the slice type with the least RD cost.

For another embodiment, new intra skip mode for each basic coding unit is used. Intra skip mode benefits sparse data coding for a block-based algorithm where the prediction from already reconstructed neighboring pixels are used to reconstruct the content. High sub-band signals usually contain a lot of flat areas, and the high frequency components are sparsely located. It might be advantageous to use one bit to distinguish whether an area is flat or not. In particular, an intra skip mode was defined to indicate an MB with flat content. Whenever an intra skip mode is decided, the area is not coded, no further residual is sent out, and the DC value of the area is predicted by using the pixel values in the neighboring MB.

Specifically, the intra skip mode is an additional MB level flag. The MB can be any size. In AVC, the MB size is 16×16. For some video codecs, larger MB sizes (32×32, 64×64, etc.) for high definition video sequences are proposed. Intra skip mode benefits from the larger MB size because of the potential fewer bits generated from the flat areas. The intra skip mode is only enabled in the coding of the high band signals and disabled in the coding of the low band signals. Because the flat areas in low frequency channel are not as frequent as those in the high frequency channels, generally speaking, the intra skip mode increases the bit rate for low frequency channels while decreasing the bit rate for high frequency channels. The skip mode can also apply to an entire channel or band.

Figure 10:
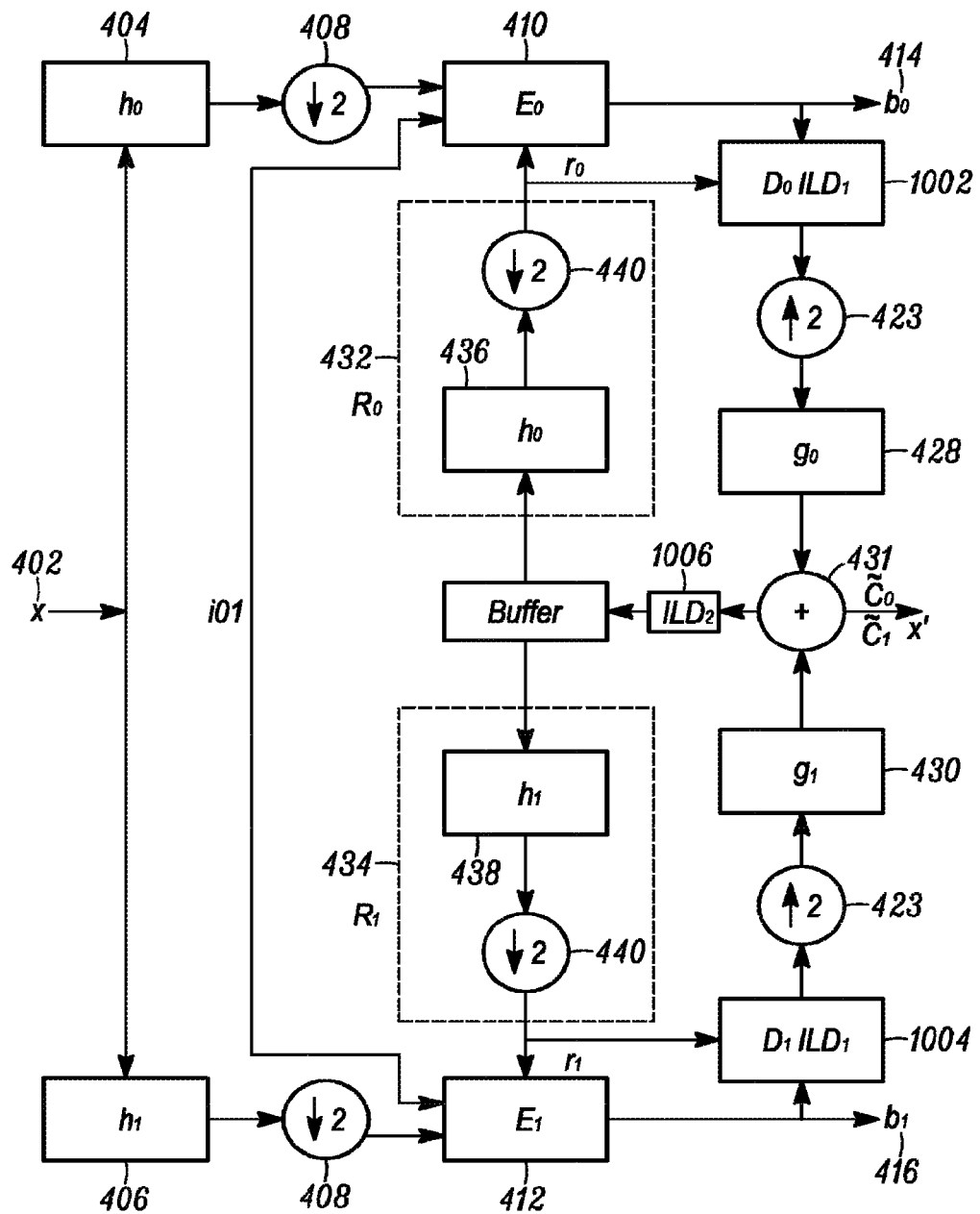
FIG. 10 is an illustration of an encoder incorporating some of the principles of the disclosure.
Figure 11:
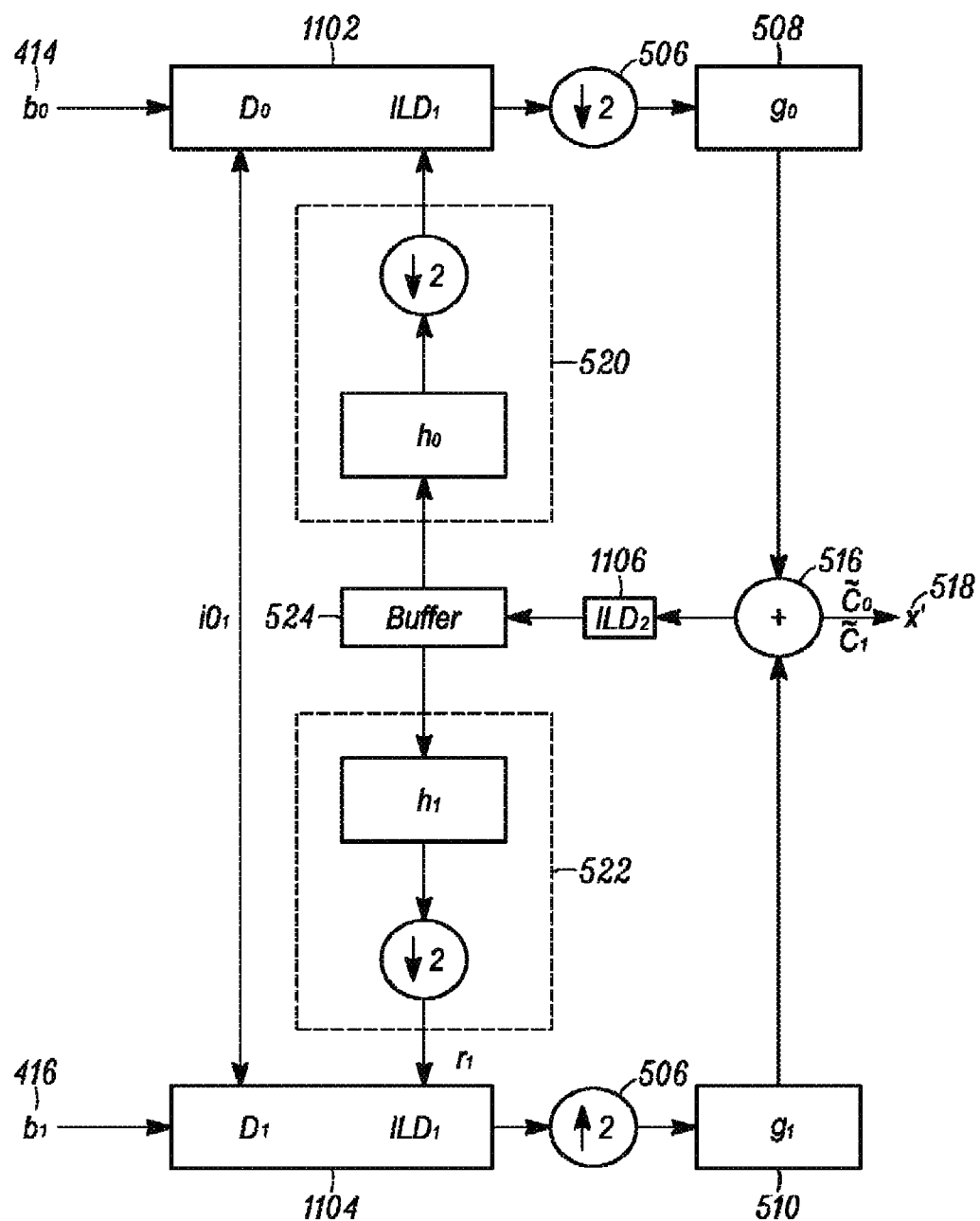
FIG. 11 is an illustration of a decoder corresponding to the encoder shown in FIG. 10.

For yet another embodiment, an inloop deblocking filter is used. An inloop deblocking filter helps the RD performance and the visual quality in the AVC codec. There are two places where the inloop deblocking filter can be placed in the HVC encoder. These are illustrated in FIG. 10 for the encoder and in FIG. 11 for the corresponding decoder. FIGS. 10 and 11 are configured as the encoder 400 of FIG. 4 and the decoder 500 of FIG. 5 where similar components are numbered similarly and perform the same function as described above. One inloop deblocking filter is a part of the decoder $D_i$ 1002, 1004 is at the end of each individual channel reconstruction. The other inloop deblocking filter 1006 is after channel synthesis and the reconstruction of the full picture by combiner 431. The first inloop deblocking filters 1002, 1004 are used for the channel reconstruction and produce an intermediate signal. Its smoothness on the MB boundaries may improve the final picture reconstruction in an RD sense. They also can result in the intermediate signals varying further away from the true values so that a performance degradation is possible. To overcome this, the inloop deblocking filters 1002, 1004 can be configured for each channel based on the properties of how that channel is to be synthesized. For example, the filters 1002, 1004 can be based on the up sampling direction as well as on the synthesis filter type.

On the other hand, the inloop deblocking filter 1006 should be helpful after picture reconstruction. Due to the nature of the sub-band/channel coding, the final reconstructed pictures preserve artifacts other than blockiness, such as ringing effects. Thus, it is better to redesign the inloop filter to effectively treat those artifacts.

It is understood that the principles described for inloop deblocking filters 1002-1006 apply to the inloop deblocking filters 1102, 1104, and 1106 that are found in decoder 1100 of FIG. 11.

In another embodiment, sub-band dependent entropy coding can be used. The legacy entropy coders such as VLC tables and CABAC in conventional codecs (AVC, MPEG, etc.) are designed based on the statistical characteristics from natural images in some transform domain (e.g., DCT in case of AVC which tend to follow some mix of Laplacian and Gaussian distributions). The performance of sub-band entropy coding can be enhanced by using an entropy coder based on the statistical characteristics of each sub-band.

In yet another embodiment, decomposition dependent coefficient scan order can be used. The optimal decompositioning choice for each partition can be indicative of the orientation of features in the partition. Therefore, it would be preferable to use a suitable scan order prior to entropy coding of the coding transform coefficients. For example, it is possible to assign a specific scan order to each sub-band for each of the available decomposition schemes. Thus, no extra information needs to be sent to communicate the choice of scan order. Alternatively, it is possible to selectively choose and communicate the scanning pattern of the coded coefficients, such as quantized DCT coefficients in the case of AVC, from a list of possible scan order choices and send this scan order selection for each coded sub-band of each partition. This requires the selection choices be sent for each sub-band of the given decomposition for a given partition. This scan order can also be predicted from the already coded sub-bands with the same directional preference. In addition, fixed scan order per sub-band and per decomposition choice can be performed. Alternatively, a selective scanning pattern per sub-band in a partition can be used.

In an embodiment, sub-band distortion adjustment can be used. Sub-band distortion can be based on the creation of more information from some sub-bands while not producing any information for other sub-bands. Such distortion adjustments can be done via distortion synthesis or by distortion mapping from sub-bands to the pixel domain. In the general case, the sub-band distortion can be first mapped to some frequency domain and then weighted according to the frequency response of the sub-band synthesis process. In conventional video coding schemes, many of the coding decisions are carried out by minimization of a rate-distortion cost. The measured distortion in each sub-band does not necessarily reflect the final impact of the distortion from that sub-band to the final reconstructed picture or picture partition. For perceptual quality metrics, this is more obvious where the same amount of distortion, e.g., MSE in one of the frequency sub-bands, would have a different perceptual impact for the final reconstructed image than the same amount of distortion in a different sub-band. For non-subjective quality measures such as MSE, the spectral density of distortion can impact the distortion in the quality of the synthesized partition.

To address this, it is possible to insert the noisy block into the otherwise noiseless image partition. In addition, sub-band up-sampling and synthesis filtering may be necessary before calculating the distortion for that given block. Alternatively, it is possible to use a fixed mapping from distortion in sub-band data to a distortion in the final synthesized partition. For perceptual quality metrics, this may involve gathering subjective test results to generate the mapping function. For a more general case, the sub-band distortion can be mapped to some finer frequency sub-bands where the total distortion would be a weighted sum of each sub-sub-band distortion according to the combined frequency response from the upsampling and synthesis filtering.

In another embodiment, range adjustment is provided. It is possible that sub-band data can be a floating point that needs to be converted to integer point with a certain dynamic range. The encoder may not be able to handle the floating point input so the input is changed to compensate for what is being received. The can be achieved by using integer implementation of sub-band decomposition via a lifting scheme. Alternatively, a generic bounded quantizer can be used that is constructed by using a continuous non-decreasing mapping curve (e.g., a sigmoid) followed by a uniform quantizer. The parameters for the mapping curves should be known by the decoder or passed to it to reconstruct the sub-band signal prior to upsampling and synthesis.

The HVC described offers several advantages. Frequency sub-band decomposition can provide better band-separation for better spatio-temporal prediction and coding efficiency. Since most of the energy in typical video content is concentrated in a few sub-bands, more efficient coding or band-skipping can be performed for the low-energy bands. Sub-band dependent quantization, entropy coding, and subjective/objective optimization can also be performed. This can be used to perform coding according to the perceptual importance of each sub-band. Also, compared to other prefiltering-only approaches, a critically sampled decomposition does not increase the number of samples, and perfect reconstruction is possible.

From a predictive coding perspective, HVC adds cross sub-band prediction in addition to the spatial and temporal prediction. Each sub-band can be coded using a picture type (e.g., I/P/B slices) different from the other sub-bands as long as it adheres to the picture/partition type (e.g., an Intra-type partition can only have Intra-type coding for all its sub-bands). By virtue of the decomposition, the virtual coding units and transform units are extended without the need for explicitly designing new prediction modes, sub-partitioning schemes, transforms, coefficient scans, entropy coding, etc.

Lower computational complexity is possible in HVC where time-consuming operations such as, for example, motion estimation, are performed only on the decimated low frequency sub-bands. Parallel processing of sub-bands and decompositions is also possible.

Because the HVC framework is independent of the particular channel or sub-band coding used, it can utilize different compression schemes for the different bands. It does not conflict with other proposed coding tools (e.g., KTA and the proposed JCT-VC) and can provide additional coding gains on top of other coding tools.

The principles of HVC described above for 2D-video streaming can also apply to 3D-video outputs such as for 3DTV. HVC can also take most advantage of the 3DTV compression technologies, where newer encoding and decoding hardware is required. Because of this, there has been recent interest in systems that provide a 3D-compatible signal using existing 2D codec technology. Such a "base layer" ("BL") signal would be backward compatible with existing 2D hardware, while newer systems with 3D hardware can take advantage of additional "enhancement layer" ("EL") signals to deliver higher quality 3D signals.

One way to achieve such migration-path coding to 3D is to use a side-by-side or top/bottom 3D panel format for the BL, and use the two full resolution views for the EL. The BL can be encoded and decoded using existing 2D compression such as AVC with only small additional changes to handle the proper signaling of the 3D format (e.g., frame packing SEI messages, and HDMI 1.4 signaling). Newer 3D systems can decode both BL and EL and use them to reconstruct the full resolution 3D signals.

For 3D video coding the BL and the EL may have concatenating views. For the BL, the first two views, e.g., left and right views, may be concatenated, and then the concatenated 2× picture would be decomposed to yield the BL. Alternatively, a view can be decomposed, and then the low frequency sub-bands from each view can be concatenated to yield the BL. In this approach the decomposition process does not mix information from either view. For the EL, the first two views may be concatenated, and then the concatenated 2× picture would be decomposed to yield the enhancement layer. Each view may be decomposed and then coded by one enhancement layer or two enhancement layers. In the one enhancement layer embodiment, the high frequency sub-bands for each view would be concatenated to yield the EL as large as the base layer. In the two layer embodiment, the high frequency sub-band for one view would be coded first, as the first enhancement layer and then the high frequency sub-band for the other view would be coded as the second enhancement layer. In this approach the EL_1 can use the already coded EL_0 as a reference for coding predictions.

Figure 12:
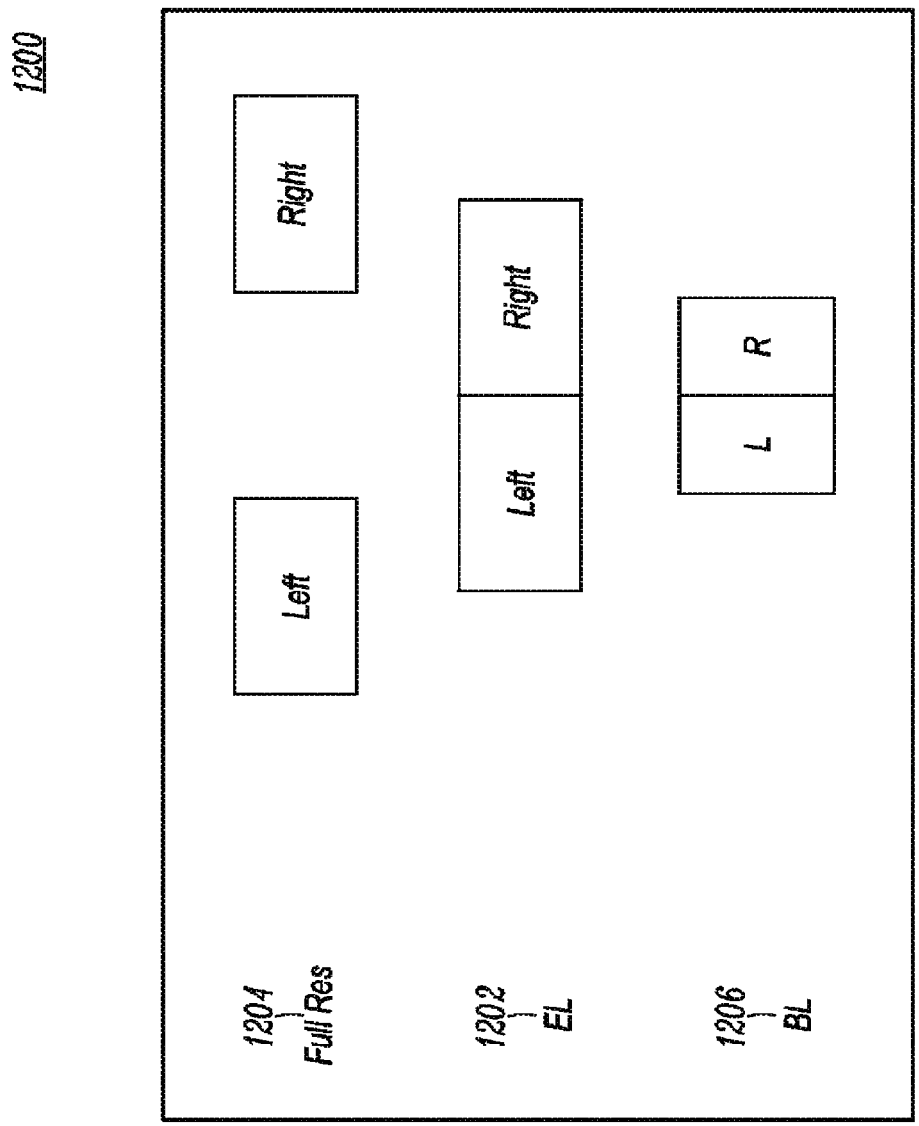
FIG. 12 is an illustration of 3D encoding.

FIG. 12 shows the approach to migration-path coding using scalable video coding ("SVC") compression 1200 for the side-by-side case. As can be understood, the extension to other 3D formats (e.g., top/bottom, checkerboard, etc.) is straightforward. Thus, the description focuses on the side-by-side case. The EL 1202 is a concatenated double-width version of the two full resolution views 1204, while the BL 1206 is generally a filtered and horizontally subsampled version of the EL 1204. SVC spatial scalability tools can then be used to encode the BL 1206 and EL 1202, where the BL is AVC-encoded. Both full resolution views can be extracted from the decoded EL.

Figure 13:
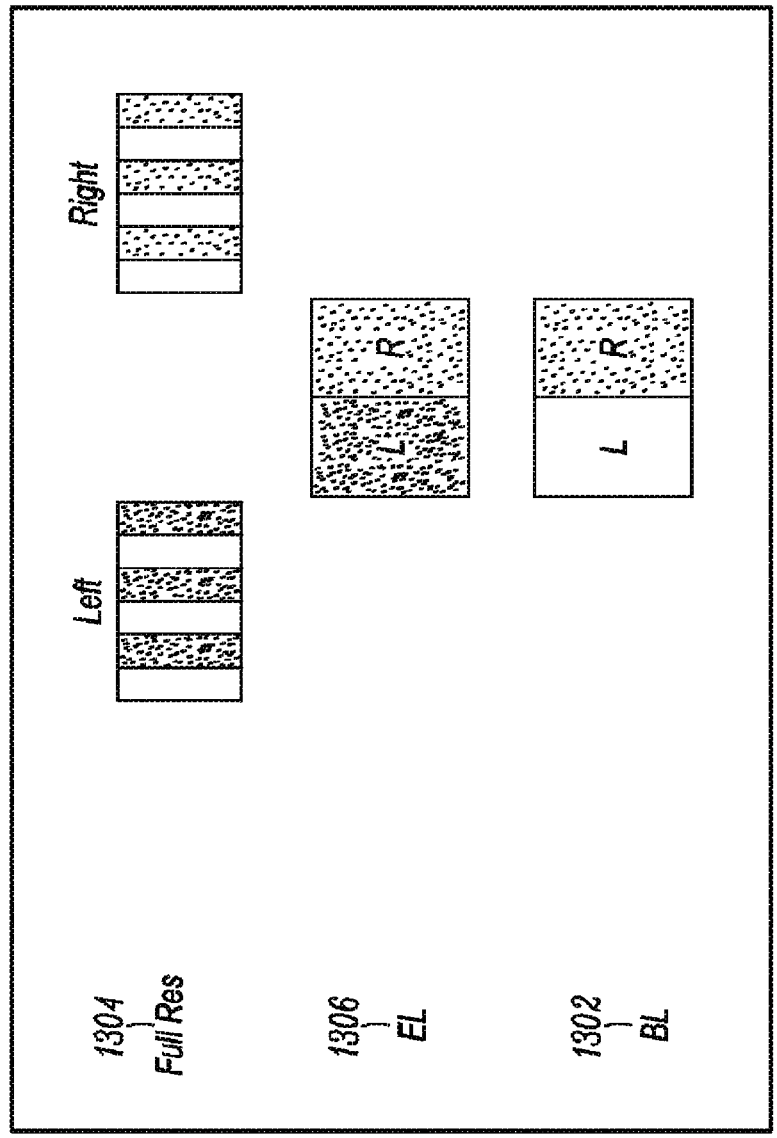
FIG. 13 is another illustration of 3D encoding.

Another possibility for migration-path coding is to use multiview video coding ("MVC") compression. In the MVC approach, the two full resolution views are typically sampled without filtering to produce two panels. In FIG. 13, the BL panel 1302 contains the even columns of both the left and right views in the full resolution 1304. The EL panel 1306 contains the odd columns of both views 1304. It is also possible for the BL 1302 to contain the even column of one view and the odd column of the other view, or vice-versa, while the EL 1306 would contain the other parity. The BL panel 1302 and EL panel 1306 can then coded as two views using MVC, where the GOP coding structure is chosen so that the BL is the independent AVC-encoded view, while the EL is coded as a dependent view. After decoding both BL and EL, the two full resolution views can be generated by appropriately re-interleaving the BL and EL columns. Pre-filtering is typically not performed in generating the BL and EL views so that the original full resolution views can be recovered in the absence of coding distortion.

Figure 14:
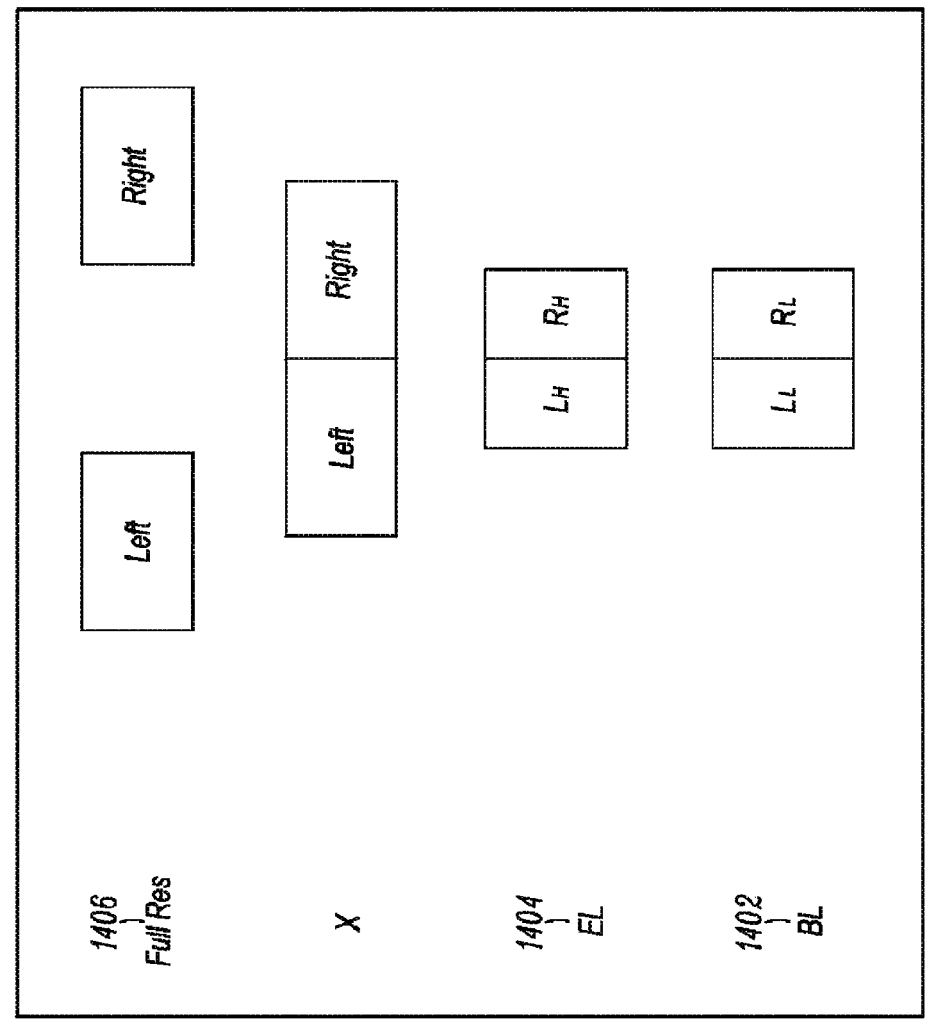
FIG. 14 is yet another illustration of 3D encoding.

Turning to FIG. 14, it is possible to apply HVC in migration-path 3DTV coding since typical video content tends to be low-frequency in nature. When the input to HVC is a concatenated double-width version of the two full resolution views, the BL 1402 is the low frequency band in a 2-band horizontal decomposition (for the side-by-side case) of the full resolution view 1406, and the EL 1404 can be the high frequency band.

Figure 15:
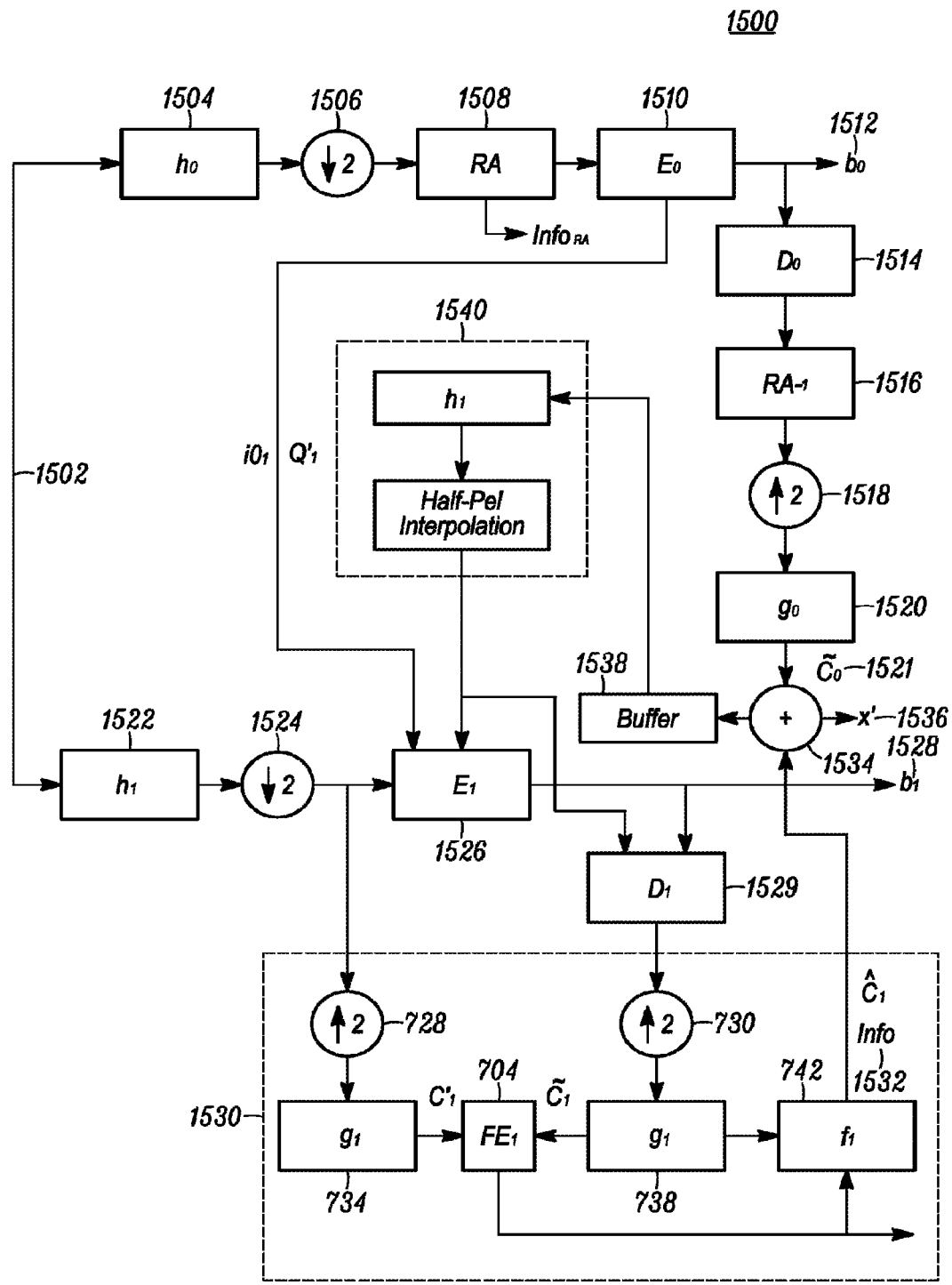
FIG. 15 is an illustration of an encoder incorporating some of the principles of the disclosure.

This HVC approach to 3DTV migration path coding by encoder 1500 is shown in FIG. 15, which is an application and special case of the general HVC approach. As seen, many of the principles discussed above are included in the migration path for this 3DTV approach. A low frequency encoding path using input video coding stream 1502 is shown using some of the principles described in connection with FIG. 4. Since it is desired that the BL be AVC-compliant, the top low-frequency channel in FIG. 15 uses AVC tools for encoding. A path of the stream 1502 is filtered using filter $h_0$ 1504 and decimated by sampler 1506. A range adjustment module 1508 restricts the range of the base layer as described in more detail below. Information $info_{RA}$ can be used by the encoder shown, the corresponding decoder (see FIG. 16), as well as by other encoders as described above. The restricted input signal is then provided to encoder $E_o$ 1510 to produce bitstream $b_o$ 1512. Coding information $i_{o1}$ which contains information regarding the high and low band signals from the encoder, decoder, or other channels is provided to the encoder 1526 to improve the performance. As is understood, the bitstream $b_o$ can be reconstructed using a reconstruction loop. The reconstruction loop includes a complementary decoder $D_0$ 1514, range adjustment ("RA") module $RA^{-1}$ 1516, sampler 1518, and filter $g_0$ 1520.

A high frequency encoding path is also provided, which is described in connection with FIG. 15. Unlike the low frequency channel discussed above, the high frequency channel can use additional coding tools such as undecimated interpolation, ASF, cross sub-band mode, motion-vector prediction, Intra Skip mode, etc. The high frequency channel can even be coded dependently where one view is independently encoded, and the other view is dependently encoded. As described in connection with FIG. 15, the high frequency band includes the filter $h_1$ 1522 that filters the high frequency input stream x that is then decimated by sampler 1524. Encoder $E_1$ 1526 encodes the filtered and decimated signal to form bitstream $b_1$ 1528.

Like the low frequency channel, the high frequency channel includes a decoder $D_1$ 1529 which feeds a decoded signal to the interpolation module 1530. The interpolation module 1530 is provided for the high frequency channel to produce information info 1532. The interpolation module 1530 corresponds to the interpolation module 726 shown in FIG. 7 and includes samplers 728, 730, filters $g_1$ 734, 738, $FE_1$ filter 704, and filter $f_1$ 742 to produce information $info_1$. The output from the decoded low frequency input stream 1521 and from the interpolation module 1532 are combined by combiner 1534 to produce the reconstructed signal x' 1536.

The reconstructed signal x' 1536 is also provided to the buffer 1538, which is similar to the buffers described above. The buffered signal can be supplied to reference picture processing module $Q'_1$ 1540 as described in connection with FIG. 9(b). The output of the reference picture processing module is supplied to the high frequency encoder $E_1$ 1526. As shown, the information $i_{o1}$ from the reference picture processing module that includes coding the low frequency channel can be used in coding the high frequency channel but not necessarily vice-versa.

Since the BL is often constrained to be 8 bits per color component in 3DTV, it is important that the output of the filter $h_0$ (and decimation) be limited in bit-depth to 8 bits. One way to comply with restricted dynamic range of the base layer is to use some RA operation performed by RA module 1508. The RA module 1508 is intended to map the input values into the desired bit-depth. In general, the RA process can be accomplished by a Bounded Quantization (uniform or non-uniform) of the input values. For example, one possible RA operation can be defined as:

$$RAout=clip(round(scale*RAin+offset)),$$

where round( ) approximates to the nearest integer, and clip( ) limits the range of values to [min, max] (e.g., [0, 255] for 8 bits), and scale≠0. Other RA operations can be defined, including ones that operate simultaneously on a group of input and output values. The RA parameter information needs to be sent to the decoder (as $info_{RA}$) if these parameters are not fixed or somehow are not known to the decoder. The "inverse" $RA^{-1}$ module 1516 rescales the values back to the original range, but of course with some possible loss due to rounding and clipping in the forward RA operation, where:

$$RA^{-1}out=(RA^{-1}in-offset)/scale.$$

Range adjustment of the BL provides for acceptable visual quality by scaling and shifting the sub-band data or by using a more general nonlinear transformation. In an embodiment of fixed scaling, a fix scaling is set such that the DC gain of synthesis filter and scaling is one. In adaptive scaling and shifting two parameters of scale and shift for each view are selected such that the normalized histogram of that view in the BL has the same mean and variance as the normalized histogram of the corresponding original view.

Figure 16:
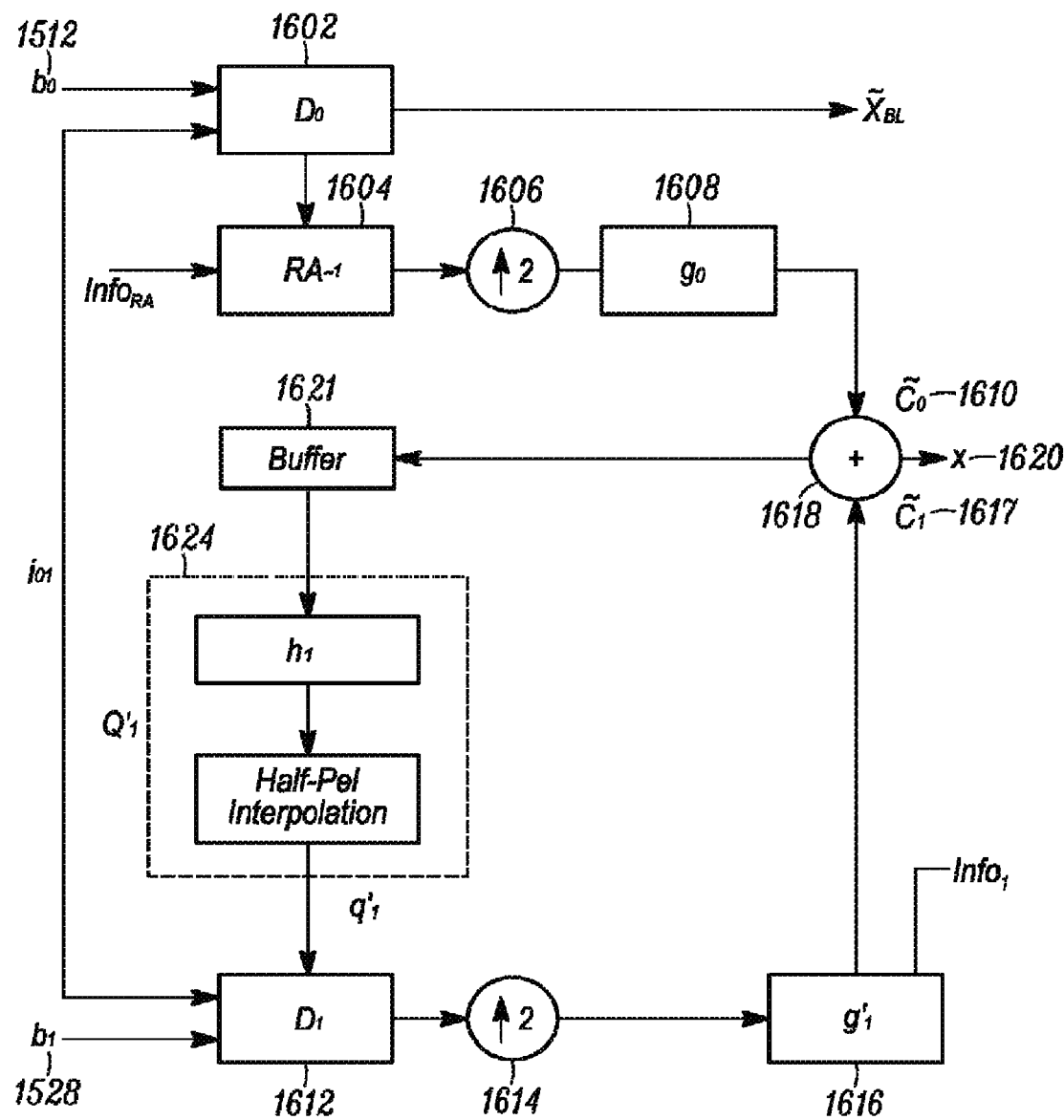
FIG. 16 is an illustration of decoder corresponding to the encoder shown in FIG. 15.

The corresponding decoder 1600 shown in FIG. 16 also performs the $RA^{-1}$ operation but only for purposes of reconstructing the double-width concatenated full resolution views, as the BL is assumed to be only AVC decoded and output. The decoder 1600 includes a low frequency channel decoder $D_0$ 1602 which can produce a decoded video signal {tilde over (x)}$_{b1}$ for the base layer. The decoded signal is supplied to the reverse range adjustment module $RA^{-1}$ 1604 that is resampled by sampler 1606 and filtered by filter $g_o$ 1608 to produce the low frequency reconstructed signal {tilde over (c)}$_0$ 1610. For the high frequency path, the decoder $D_1$ 1612 decodes the signal that is then resampled by sampler 1614 and filtered by filter $g'_1$ 1616. Information info, can be provided to the filter 1616. The output of the filter 1616 produces a reconstructed signal {tilde over (c)} 11617. The reconstructed low frequency and high frequency signals are combined by combiner 1618 to create the reconstructed video signal {tilde over (x)} 1620. The reconstructed video signal {tilde over (x)} 1620 is supplied to the buffer 1621 to be used by other encoders and decoders. The buffered signal can also be provided to a reference picture processing module 1624 that is fed back into the high frequency decoder $D_1$.

The specific choice of RA modules can be determined based on perceptual and coding efficiency considerations and tradeoffs. From a coding efficiency point of view, it is often desirable to make use of the entire output dynamic range specified by the bit-depth. Since the input dynamic range to RA is generally different for each picture or partition, the parameters that maximize the output dynamic range will differ among pictures. Although this may not be a problem from a coding point of view, it may cause problems when the BL is decoded and directly viewed, as the $RA^{-1}$ operation may not be performed before being viewed, possibly leading to variations in brightness and contrast. This is in contrast to the more general HVC, where the individual channels are internal and not intended to be viewed. An alternative solution to remedy the loss of information associated with the RA process is to use an integer implementation of sub-band coding using a lifting scheme which brings the base band layer to the desired dynamic range.

If the AVC-encoded BL supports the adaptive range scaling per picture or partition $RA^{-1}$ (such as through SEI messaging), then the RA and $RA^{-1}$ operations can be chosen to optimize both perceptual quality and coding efficiency. In the absence of such decoder processing for the BL or information about the input dynamic range, one possibility is to choose a fixed RA to preserve some desired visual characteristic. For example, if the analysis filter $h_0$ 1504 has a DC gain of α·0, a reasonable choice of RA in module 1508 is to set gain=1/α and offset=0.

It is worth noting that although it is not shown in FIGS. 15 and 16, the EL can also undergo similar RA and $RA^{-1}$ operations. However, the EL bit-depth is typically higher than that required by the BL. Also, the analysis, synthesis, and reference picture filtering of the concatenated double-width picture by $h_i$ and $g_i$ in FIGS. 15 and 16 can be performed so that there is no mixing of views around the view border (in contrast to SVC filtering). This can be achieved, for example, by symmetric padding and extension of a given view at the border, similar to that used at the other picture edges.

In view of the foregoing, the discussed HVC video coding provides a framework that offers many advantages and flexibility over traditional pixel domain video coding. An application of the HVC coding approach can be used to provide a scalable migration path to 3DTV coding. Its performance appears to provide some promising gains compared to other scalable approaches such as SVC and MVC. It uses existing AVC technology for the lower resolution 3DTV BL and allows for additional tools for improving coding efficiency of the EL and full resolution views.

Figure 17:
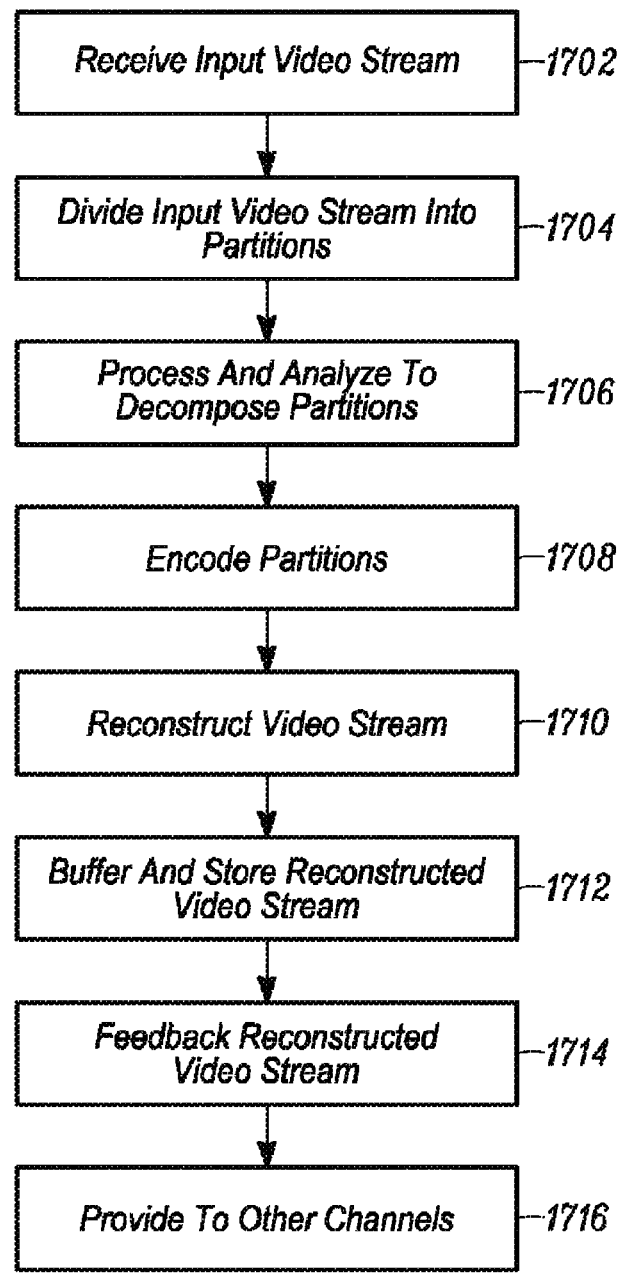
FIG. 17 is a flow chart showing the operation of encoding an input video stream according to some embodiments of the disclosure.

Turning to FIG. 17, the devices described above perform a method 1700 of encoding an input video stream. The input video stream is received 1702 at a headend 110 of a video distribution system and is divided 1704 into a series of partitions based on at least one feature set of the input video stream. The feature set can be any type of features of the video stream including features of the content, context, quality, and coding functions of the video stream. In addition, the input video stream can be partitioned according to the various channels of the video stream such that each channel is separately divided according to the same or different feature sets. After dividing, the partitions of the input video stream are processed and analyzed to decompose 1706 the partitions for encoding by such operations as decimation and sampling of the partitions. The decomposed partitions are then encoded 1708 to produced encoded bitstreams. As a part of the encoding process, coding information can be provided to the encoder. The coding information can include input information from the other channels of the input video stream as well as coding information based on a reconstructed video stream. Coding information can also include information regarding control and quality information about the video stream as well as information regarding the feature sets. In an embodiment, the encoded bitstream is reconstructed 1710 into a reconstructed video stream which can be buffered and stored 1712. The reconstructed video stream can be fed back 1714 into the encoder and used as coding information as well as provided 1716 to encoders for other channels of the input video stream. As understood from the description above, the process of reconstructing the video stream as well as providing the reconstructed video stream as coding information can include the processes of analyzing and synthesizing the encoded bitstreams and reconstructed video stream.

Figure 18:
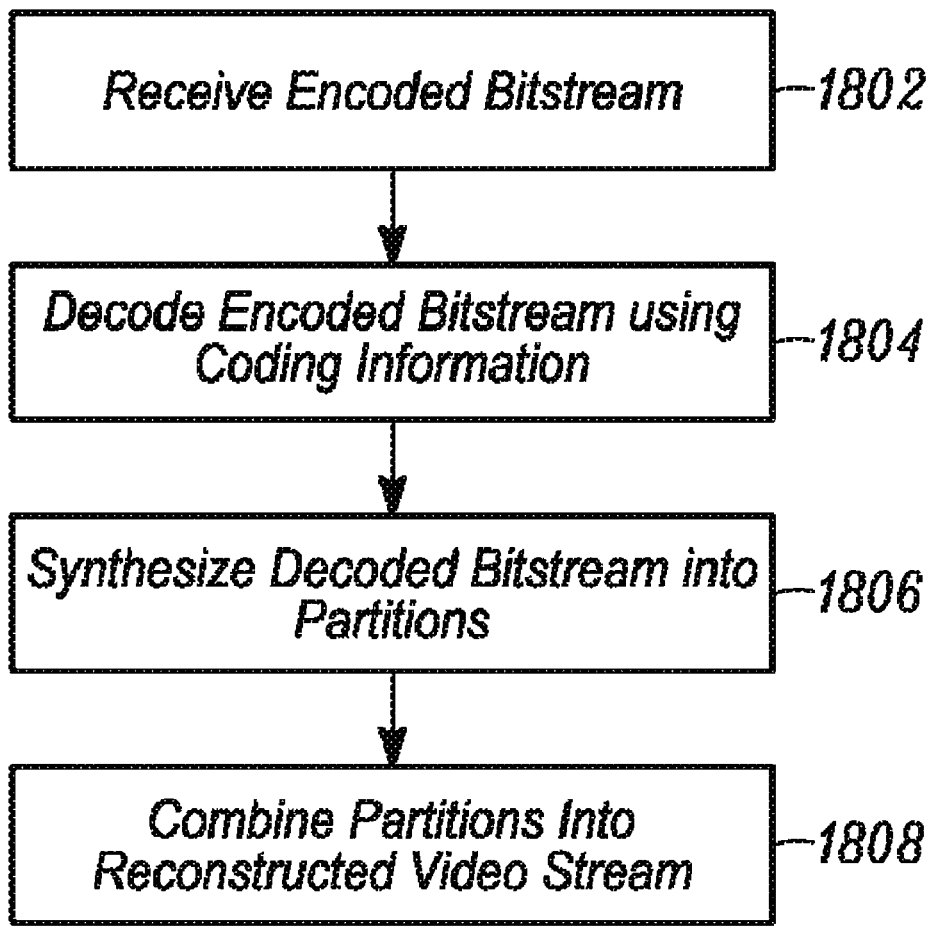
FIG. 18 is a flow chart showing the operation of decoding an encoded bitstream according to some embodiments of the disclosure.

FIG. 18 is a flow chart that illustrates a method 1800 of decoding encoded bitstreams that are formed as a result of the method shown in FIG. 17. The encoded bitstreams are received 1802 by a subscriber unit 150 *a-n* as a part of a video distribution system. The bitstreams are decoded 1804 using coding information that is received by the decoder. The decoding information can be received as a part of the bitstream or it can be stored by the decoder. In addition, the coding information can be received from different channels for the video stream. The decoded bitstream is then synthesized 1806 into a series of partitions that are then combined 1808 to create a reconstructed video stream that corresponds to the input video stream described in connection with FIG. 17.

Figure 19:
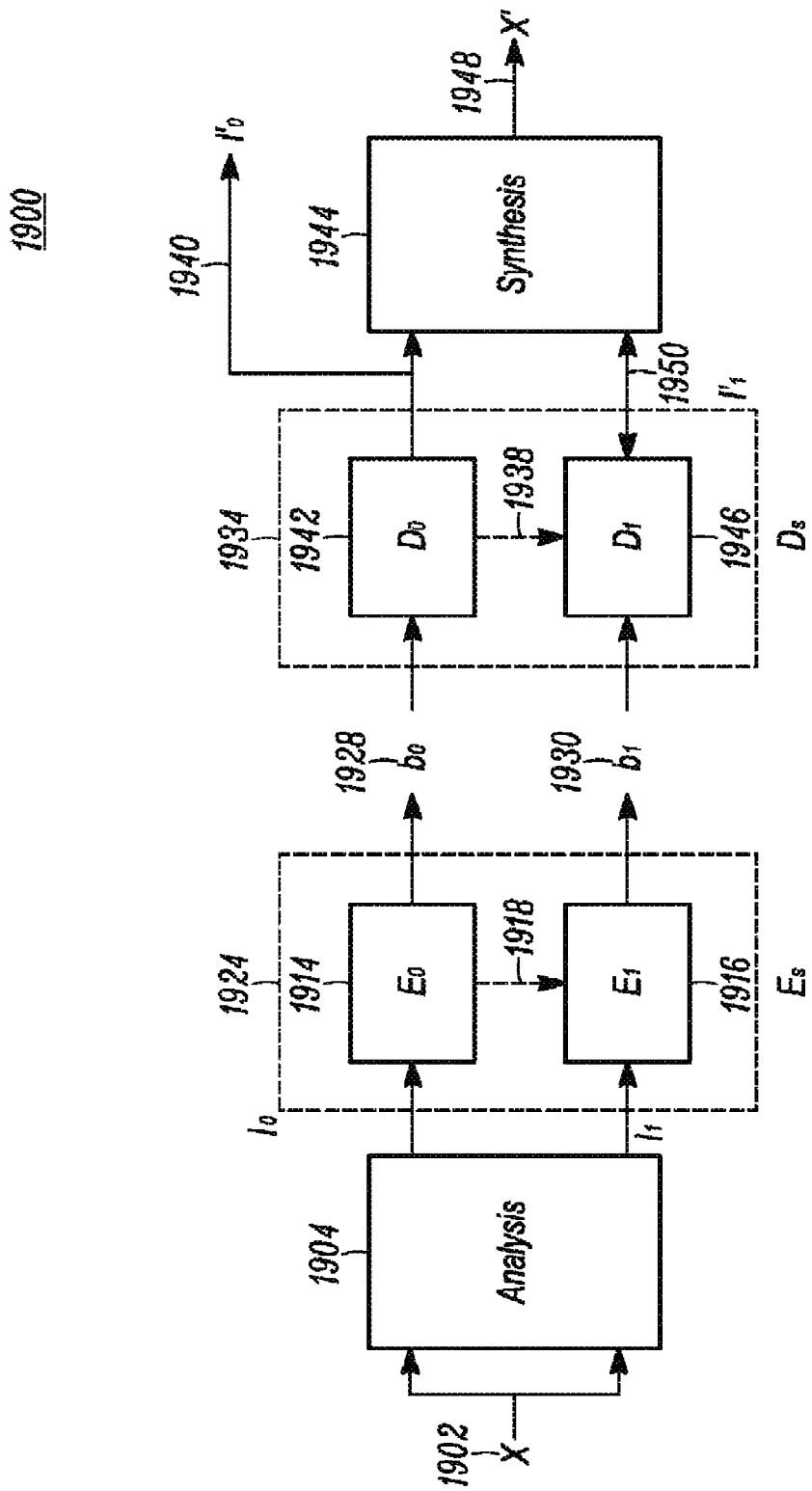
FIG. 19 illustrates the decomposition of an input x into two layers through analysis filtering according to some embodiments of the disclosure.

Yet another implementation makes use of a decomposition of the input video into features that can be both efficiently represented and better matched to perception of the video. Although the most appropriate decomposition may depend on the characteristics of the video, this contribution focuses on a decomposition for a wide variety of content including typical natural video. FIG. 19 is a high-level diagram 1900 where the input video signal x 1902 is decomposed into two sets of features by an analysis filtering device 1904. In this example, the filtering separates input video signal x 1902 into different spatial-frequency bands. Although the input video signal x 1902 can correspond to a portion of a picture or to an entire picture, the focus in this contribution is on the entire picture. For typical video, most of the energy can be concentrated in the low frequency layer $l_0$ as compared to the high frequency layer h. Also, $l_0$ tends to capture local intensity features, while h captures variational detail such as edges.

Each layer $l_i$ can then be encoded by an encoder 1924 with one or more encoders $E_i$ 1914, 1916 to produce bitstreams $b_i$ 1928, 1930. For spatial scalability, the analysis process can include filtering followed by subsampling so that $b_0$ can correspond to an appropriate base layer bitstream. As an enhancement bitstream, $b_1$ can be generated using information from the base layer $l_0$ as indicated by the arrow 1918 from $E_0$ to $E_1$. The combination of $E_0$ and $E_1$ may be referred to as the overall scalable encoder $E_s$ 1924.

The scalable decoder $D_s$ 1934 may include one or more decoders $D_i$ such as base layer decoder $D_0$ 1942 and enhancement layer decoder $D_1$ 1946. The base layer bitstream $b_0$ 1928 can be decoded by $D_0$ 1942 to reconstruct the layer $l'_0$ 1940. The enhancement layer bitstream $b_1$ 1930 can be decoded by $D_1$ 1946 together with possible information from $b_0$ 1928 as indicated by the arrow 1938 to reconstruct the layer $l'_1$ 1950. The two decoded layers, $l'_0$ 1940 and $l'_1$ 1950 can then be used to reconstruct x' 1948 using a synthesis device 1944 or synthesis operation. In some embodiments, decoder $D_1$ 1946 is configured to receive information from the synthesis device 1944 in order to improve reconstruction of layer $l'_1$ 1950. Such information might include the reconstructed x' 1948 corresponding to previous pictures.

In some embodiments, decoder $D_s$ 1934 is configured to reconstruct the features from the bitstreams $b_i$ 1928, 1930 with possible joint use of information from all the bitstreams being sent between the headend 110 and the subscriber units 105 *a-n*. The features are combined by combiner 121 to produce the reconstructed output video signal x' 1948. As can be understood, output video signal x' 1948 corresponds to the input video signal x 1902.

To illustrate the proposed embodiments for spatial scalability, critical sampling was used in a two-band decomposition at the picture level. Both horizontal and vertical directions were subsampled by a factor of two, resulting in a four-layer scalable system. Simulations were performed using HM 2.0 for both encoders $E_i$ and decoders $D_i$. Although it is possible to improve coding efficiency by exploiting correlations among the layers, these simulations do not make use of any interlayer prediction.

The performance of the proposed implementation was compared to the single layer and simulcast cases. In the single layer case, x is encoded using HM 2.0 directly. In the simulcast case, the bitrate is determined by adding together the bits for encoding x directly and the bits for encoding $l_0$ directly, while the PSNR is that corresponding to the direct encoding of x. In the proposed implementation, the bitrate corresponds to the bits for all layers, and the PSNR is that for x'.

Efficient representation: By utilizing critically sampled layers, the encoders $E_i$ in this example operate on the same total number of pixels as the input x. This is in contrast to SVC, where for spatial scalability there is an increase in the total number of pixels to be encoded, and the memory requirement is also increased.

General spatial scalability: The implementation can extend to other spatial scalability factors, for example, 1:n, where the input spatial resolution is 1/n that of the output spatial resolution. Because the layers can have the same size, there can be a simple correspondence in collocated information (e.g., pixels, CU/PU/TU, motion vectors, coding modes, etc.) between layers. This is in contrast to SVC, where the size (and possibly shape) of the layers are not the same, and the correspondence in collocated information between layers may not be as straightforward.

Sharpness enhancement: The implementations disclosed can be used to achieve sharpness enhancement as additional layers provide more detail to features such as edges. This type of sharpness enhancement is in contrast to other quality scalable implementations that improve quality only by changes in the amount of quantization.

Independent coding of layers: The simulation results for spatial scalability indicate that it is possible to perform independent coding of layers while still maintaining good coding efficiency performance. This makes parallel processing of the layers possible, where the layers can be processed simultaneously. For the two-layer spatial scalability case with SVC, independent coding of the layers (e.g., no inter-layer prediction) can correspond to the simulcast case. Note that with independent coding of layers, errors in one layer do not affect the other layers. In addition, a different encoder $E_i$ can be used to encode each $l_i$ to better match the characteristics of the layer.

Dependent coding of layers: In the implementations disclosed, dependent coding of layers can improve coding efficiency. When the layers have the same size, sharing of collocated information between layers is simple. It is also possible to adaptively encode layers dependently or independently to trade-off coding efficiency performance with error resiliency performance.

Enhanced Base Layer: As described above, the BL signal would be decodable by the decoders which have access to only the BL bitstream, while decoders with access to both BL and EL bitstreams can take advantage of additional EL signals to reconstruct higher quality BL pictures which will be used as reference for decoding EL signals. While BL and EL may be used to refer generally to the two different types of layers, it may be beneficial to describe these two types of layers more specifically. For example, as used herein, "Layer 0" may be used interchangeably with BL. As used herein, "Layer 1", "Layer 2", "Layer 3", etc. may be used to refer to ELs at different levels, with "Layer 1" representing a first (and sometimes the only) EL, "Layer 2" representing a second EL, "Layer 3" representing a third EL, and so on.

In some embodiments, information such as coding parameters and reconstructed data can be used to improve the performance of one or more layers or the overall output. In some embodiments, the improved performance may be attributable to an improved or enhanced base layer.

As described briefly above, FIG. 19 illustrates the decomposition of the input x 1902 into two layers, the BL $l_0$ and the EL $l_1$. The input x 1902 can correspond to a portion of a picture or to an entire picture. Examples of analysis such as pre-processing operations (e.g., performed by the analysis filtering device 1904) include filtering and sampling operations. Examples of synthesis such as post-processing operations (e.g., performed by the synthesis device 1944) may include also include appropriate filtering, interpolation, and combination of layers.

In the absence of coding, the overall system may or may not achieve perfect reconstruction. Also, depending on sampling, the layers may or may not be the same size, and they may differ from the size of the original input x 1902. For the two layer decomposition, the BL can reflect low spatial frequencies, and EL can reflect high spatial frequencies. In another example for spatial scalability, the BL may be a filtered and downsampled version (not shown) of x 1902, while the EL is x 1902.

Each layer $l_i$ may be encoded with $E_i$ 1914, 1916 to produce bitstreams $b_i$ 1928, 1930, respectively. For the EL bitstream, $b_1$ 1930 can be generated using information from the base layer $l_0$ 1928 as indicated by the arrow from $E_0$ to $E_1$ 1918. As described above, the combination of $E_0$ 1914 and $E_1$ 1916 may be referred to as the overall scalable encoder $E_s$ 1924 and the scalable decoder $D_s$ 1934 may include base layer decoder $D_0$ 1942 and enhancement layer decoder $D_1$ 1946.

The base layer bitstream $b_0$ 1928 may be decoded by $D_0$ 1942 to reconstruct the layer l'$_0$ 1940. The enhancement layer bitstream $b_1$ 1930 may be decoded by $D_1$ 1946 together with possible information from $b_0$ 1928 as indicated by arrow 1938 to reconstruct the layer l'$_1$ 1950. The two decoded layers, l'$_0$ 1940 and l'$_1$ 1950 may then be used to reconstruct x' 1948 after post-processing (e.g., synthesis). As indicated by the arrows into $D_1$ 1946, the decoder $D_1$ 1946 may be configured to receive information from decoder $D_0$ 1942 and from the post-processing unit 1944 (e.g., synthesis unit), so both BL coding information (as indicated by arrow 1938) and reconstructed data (after post-processing) may be available to the EL to improve EL performance and overall output performance.

In some embodiments, while not explicitly shown in the encoder $E_1$ 1916, the EL encoder $E_1$ 1916 also has access to both BL coding information (as indicated by arrow 1918) and reconstructed data. For backward compatibility, the system 1900 shown in FIG. 19 can be used where the BL does not receive information from the EL and is decoded using only $b_0$ 1928 with existing BL decoder $D_0$ 1942.

FIG. 20 illustrates a high-level diagram 2000 where the BL can also use information from the EL to improve BL and overall output performance. In this example, the filtering separates input video signal x 2002 into different spatial frequency bands $l_i$. Although the input video signal x 2002 can correspond to a portion of a picture or to an entire picture, the focus in this contribution is on the entire picture. For typical video, most of the energy can be concentrated in the low frequency layer $l_0$ as compared to the high frequency layer $l_1$. Also, $l_0$ tends to capture local intensity features while $l_1$ captures variational detail such as edges.

Each layer $l_i$ can then be encoded by an encoder 2024 with one or more encoders $E_1$ 2014, 2016 to produce bitstreams $b_i$ 2028, 2030. For spatial scalability, the analysis process can include filtering followed by subsampling so that $b_0$ can correspond to an appropriate base layer bitstream. As an enhancement bitstream, $b_1$ can be generated using information from the base layer $l_0$ as indicated by the arrow 2018 from $E_0$ to $E_1$. In this example, the arrow 2018 between $E_0$ and $E_1$ indicates that the BL can make use of coding information from EL as well as reconstructed data. The combination of $E_0$ and $E_1$ may be referred to as the overall scalable encoder $E_s$ 2024.

The scalable decoder $D_s$ 2034 may include one or more decoders $D_i$ such as base layer decoder $D''_0$ 2042 and enhancement layer decoder $D''_1$ 2046. The base layer bitstream $b_0$ 2028 can be decoded by $D''_0$ 2042 to reconstruct the layer $l''_0$ 2040. The enhancement layer bitstream $b_1$ 2030 can be decoded by $D''_1$ 2046 together with possible information from $b_0$ 2028 as indicated by the arrow 2038 to reconstruct the layer $l''_1$ 2050. The two decoded layers, $l'_0$ 2040 and $l''_1$ 2050 can then be used to reconstruct x" 2048 using a synthesis device 2044 or synthesis operation. In some embodiments, decoder $D''_1$ 2046 is configured to receive information from the synthesis device 2044 and from decoder $D''_0$ 2042 in order to improve reconstruction of layer $l''_1$ 2050. Examples of such information include the reconstructed x" 2048 corresponding to previous pictures and BL motion, mode, and residual information for the current picture. Similarly, in some embodiments, decoder $D''_0$ 2042 is configured to receive information from the synthesis device 2044 and from decoder $D''_1$ 2046 in order to improve reconstruction of layer $l''_0$ 2040. Examples of such information include the reconstructed x" 2048 corresponding to previous pictures and EL motion, mode, and residual information for the current picture. In order to prevent mismatches between the BL encoder and decoder, the encoder is also configured to receive and similarly use the information from the encoder $E_1$ 2016 as indicated by the arrow 2018. Although not shown in FIG. 20, the encoder also contains a decoder reconstruction loop. In some embodiments, FIG. 20 differs from FIG. 19 in the arrows into the base layer encoder and decoder at 2018, 2038, and 2040. This may allow EL information (or reconstructed output) at both BL encoder and decoder to improve BL performance. Thus, the jointly encoded bitstreams $b_i$ 2028, 2030 generated by $E_s$ 2024 can be decoded by $D_s$ 2034 to result in improved $l''_i$ 2040, 2050 and x" 2048.

Other possibilities and combinations also exist. For example, FIG. 21 is a high-level diagram 2100 where the BL encoder does not make use of EL information while the BL decoder does. Alternatively, the BL encoder may make use of EL information while the BL decoder does not. In these examples, proper encoder decisions and optimization may be used in order to deliver acceptable quality to both BL decoders that do and do not make use of EL and reconstructed data. Also, the bitstreams generated by the scalable encoder may also contain information relevant to whether EL information is used or not.

In FIG. 21, the filtering separates input video signal x 2102 into different spatial-frequency bands $l_i$. Although the input video signal x 2102 can correspond to a portion of a picture or to an entire picture, the focus in this contribution is on the entire picture. For typical video, most of the energy can be concentrated in the low frequency layer $l_0$ as compared to the high frequency layer $l_1$.

Each layer $l_i$ can then be encoded by encoder 2124 with one or more encoders $E_i$ 2114, 2116 to produce bitstreams $b_i$ 2128, 2130. For spatial scalability, the analysis process can include filtering followed by subsampling so that $b_0$ can correspond to an appropriate base layer bitstream. As an enhancement bitstream, $b_1$ can be generated using information from the base layer $l_0$ as indicated by the arrow 2118 from $E_0$ to $E_1$. The combination of $E_0$ and $E_1$ may be referred to as the overall scalable encoder $E_s$ 2124.

The scalable decoder $D_s$ 2134 may include one or more decoders $D''_i$ such as base layer decoder $D''_0$ 2142 and enhancement layer decoder $D''_1$ 2146. The base layer bitstream $b_0$ 2128 can be decoded by $D''_0$ 2142 to reconstruct the layer $l'_0$ 2140. The enhancement layer bitstream $b_1$ 2130 can be decoded by $D''_1$ 2146 together with possible information from decoder $D''_0$ 2142, as indicated by the arrow 2138, to reconstruct the layer $l''_1$ 2150. The two decoded layers, $l''_0$ 2140 and $l''_1$ 2150 can then be used to reconstruct x" 2148 using a synthesis device 2144 or synthesis operation. In some embodiments, decoder $D''_1$ 2146 is configured to receive information from the synthesis device 2144 and from decoder $D''_0$ 2142 in order to improve reconstruction of layer $l''_1$ 2150. Examples of such information include the reconstructed x" 2148 corresponding to previous pictures and BL motion, mode, and residual information for the current picture. Similarly, in some embodiments, decoder $D''_0$ 2142 is configured to receive information from the synthesis device 2144 and from decoder $D''_1$ 2146 in order to improve reconstruction of layer $l''_0$ 2140. Examples of such information include the reconstructed x" 2148 corresponding to previous pictures and EL motion, mode, and residual information for the current picture.

In contrast to FIG. 20, in the system of FIG. 21 the BL encoder does not have access to EL information (e.g., uni-arrow 2118). Although this can create the possibility of an encoder/decoder mismatch in reconstruction, this allows for an enhanced BL decoder $D''_0$ 2142 to produce an enhanced BL output $l''_0$ 2140 without requiring any changes in the BL encoder $E_0$ 2114. That is, existing BL bitstreams $b_0$ 2128 can be decoded to generate an enhanced BL output $l''_0$ 2140 using an enhanced decoder $D''_0$ 2142. In one example, if the BL decoder enhancement is performed on non-reference pictures, then encoder/decoder error propagation can be avoided.

Some examples for FIG. 21, where the BL decoder $D_0$" 2142 may make use of the EL information from $D_1$" 2146 or $l_1$" 2150 are as follows. In some embodiments, a BL decoder that does not make use of EL decoder information may output $l_0$" 2140 that has a certain level of quality. However, if a BL decoder uses the EL decoder output $l_1$" 2150 it could generate an enhanced BL output $l_0$" 2140. One possibility could be by synthesis of x" 2148 and then regeneration of $l_0$" 2140 through pre-processing (e.g., analysis filtering). Another possibility could be by adaptive synthesis filtering of the $l_0$" 2140 and $l_1$" 2150 outputs to generate an enhanced $l_0$" 2140 output. In some embodiments, the synthesis filter information could be signaled in the BL or EL bitstream.

In some embodiments, EL decoder information can be used in the BL decoder within a BL coding loop. For example, the BL decoder can use x" 2148 in a motion compensation ("MC") interpolation process for BL. In some embodiments, if the BL is at a lower spatial resolution than x" 2148, then x" 2148 can be used to generate improved interpolated samples in an enhanced BL decoder. Even if the BL is at the same resolution as x" 2148, the samples in x" 2148 can also be used to improve interpolated samples for BL MC interpolation.

In another example, if a motion vector ("MV") resolution of the EL is higher than that of the BL, the BL decoder can use the EL MV information to improve the BL MC accuracy. In some embodiments, if the BL decoder makes use of EL decoder information there may be drift between BL encoder and the BL decoder. However, if the modifications in the BL decoder are performed on non-reference frames, then error propagation to other frames may be minimized (or even prevented), and the BL can still benefit from the improved quality of these non-reference frames. In some embodiments, additional modified coding information (e.g., in the EL or another layer) may be transmitted to minimize or eliminate this drift.

Alternatively, as mentioned above, a BL encoder may optimize its decisions and encoding to target either or both BL decoder or enhanced BL decoder. EL decoder information can also be used in an enhanced BL decoder to improve error resiliency performance. For example, some information (e.g., motion vectors, modes, edge information, etc.) from the EL can be used if the corresponding BL information is corrupted or not received.

In some embodiments, BL encoder optimization may include optimizing $l_0$ reconstruction based on: (a) only $b_0$ (e.g., optimization based on BL decoder in FIG. 21) or (b) $b_0$ and $b_1$, while making sure a receiver without access to $b_1$ would be able to do an acceptable job for reconstructing $l_0$ (e.g., optimization based on enhanced BL decoder in FIG. 20). In some embodiments, BL encoder optimization may include optimizing and reconstructing $l_1$ data using: (a) reconstructed $b_0$ for embodiments of optimizing $l_0$ using only $b_0$ or (b) reconstructed $b_0$ for embodiments of optimizing $l_0$ using $b_0$ and $b_1$.

Depending on the sampling and decomposition of the layers, methods described herein can be used for both spatial and quality scalability. More than two layers can be used, and in this case, the post-processing or analysis unit can make use of one, two, etc., or all layers to reconstruct the output at various spatial resolutions or quality levels.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method for reconstructing a video stream from an encoded bitstream including a base layer bitstream and an enhancement layer bitstream, the method comprising:
   reconstructing, using a low frequency channel decoder, a base layer of the video stream by decoding the base layer bitstream based on at least one of coding information associated with the base layer bitstream or coding information associated with the enhancement layer bitstream;
   reconstructing, using a high frequency channel decoder, an enhancement layer of the video stream by decoding the enhancement layer bitstream based on the coding information associated with the enhancement layer bitstream;
   synthesizing, using a channel synthesis module, a low frequency sub-band partition from the reconstructed base layer;
   synthesizing, using the channel synthesis module, a high frequency sub-band partition from the reconstructed enhancement layer; and
   reconstructing the video stream by combining the low frequency sub-band partition and the high frequency sub-band partition based on at least one of the coding information associated with the base layer bitstream or the coding information associated with the enhancement layer bitstream.

2. The method of claim 1, wherein the base layer is decomposed to the encoded bitstream based on the low frequency sub-band partition and the enhancement layer is decomposed to the encoded bitstream based on the high frequency sub-band partition.

3. The method of claim 1, wherein the enhancement layer bitstream comprises a first enhancement layer bitstream and a second enhancement layer bitstream and the high frequency sub-band partition comprises a first high frequency sub-band partition and a second high frequency sub-band partition, and
   wherein reconstructing the video stream by combining the low frequency sub-band partition and the high frequency sub-band partition based on the at least one of the coding information associated with the base layer bitstream or the coding information associated with the enhancement layer bitstream comprises:
   reconstructing the video stream by combining the low frequency sub-band partition, the first high frequency sub-band partition, and the second high frequency sub-band partition,
   wherein the first enhancement layer is reconstructed by decoding the first enhancement layer bitstream based on coding information associated with the first enhancement layer bitstream, and
   wherein the second enhancement layer is reconstructed by decoding the second enhancement layer bitstream based on coding information associated with the second enhancement layer bitstream.

4. The method of claim 1, wherein the base layer bitstream is decoded into the base layer based on the coding information associated with the base layer bitstream and partitions of the base layer, and wherein the enhancement layer bitstream is decoded into the enhancement layer based on the coding information associated with the enhancement layer bitstream and partitions of the enhancement layer.

5. An apparatus for reconstructing a video stream from an encoded bitstream including a base layer bitstream and an enhancement layer bitstream, the apparatus comprising:
   a low frequency channel decoder configured to reconstruct a base layer of the video stream by decoding the base layer bitstream based on at least one of coding information associated with the base layer bitstream or coding information associated with the enhancement layer bitstream;
   a high frequency channel decoder configured to reconstruct an enhancement layer of the video stream by decoding the enhancement layer bitstream based on the coding information associated with the enhancement layer bitstream;
   a channel synthesis module configured to synthesize a low frequency sub-band partition from the reconstructed base layer and to synthesize a high frequency sub-band partition from the reconstructed enhancement layer;
   a processor configured to execute instructions stored in a non-transitory storage medium to reconstruct the video stream by combining the low frequency sub-band partition and the high frequency sub-band partition based on at least one of the coding information associated with the base layer bitstream or the coding information associated with the enhancement layer bitstream;
   and a buffer configured to store the reconstructed video stream.

6. The apparatus of claim 5, wherein the base layer is decomposed to the encoded bitstream based on the low frequency sub-band partition and the enhancement layer is decomposed to the encoded bitstream based on the high frequency sub-band partition.

7. The apparatus of claim 5, wherein the enhancement layer bitstream comprises a first enhancement layer bitstream and a second enhancement layer bitstream and the high frequency sub-band partition comprises a first high frequency sub-band partition and a second high frequency sub-band partition, and wherein the processor is configured to execute instructions stored in the non-transitory storage medium to reconstruct the video stream by combining the low frequency sub-band partition and the high frequency sub-band partition based on the at least one of the coding information associated with the base layer bitstream or the coding information associated with the enhancement layer bitstream by:

reconstructing the video stream by combining the low frequency sub-band partition, the first high frequency sub-band partition, and the second high frequency sub-band partition, wherein the first enhancement layer is reconstructed by decoding the first enhancement layer bitstream based on coding information associated with the first enhancement layer bitstream, and wherein the second enhancement layer is reconstructed by decoding the second enhancement layer bitstream based on coding information associated with the second enhancement layer bitstream.

8. The apparatus of claim 5, wherein the base layer bitstream is decoded into the base layer based on the coding information associated with the base layer bitstream and partitions of the base layer, and wherein the enhancement layer bitstream is decoded into the enhancement layer based on the coding information associated with the enhancement layer bitstream and partitions of the enhancement layer.

9. A non-transitory computer-readable storage medium comprising processor-executable routines that, when executed by a processor, facilitate a performance of operations for reconstructing a video stream from an encoded bitstream including a base layer bitstream and an enhancement layer bitstream, the operations comprising:

reconstructing, using a low frequency channel decoder, a base layer of the video stream by decoding the base layer bitstream based on at least one of coding information associated with the base layer bitstream or coding information associated with the enhancement layer bitstream;

reconstructing, using a high frequency channel decoder, an enhancement layer of the video stream decoding the enhancement layer bitstream based on the coding information associated with the enhancement layer bitstream;

synthesizing, using a channel synthesis module, a low frequency sub-band partition from the reconstructed base layer;

synthesizing, using the channel synthesis module, a high frequency sub-band partition from the reconstructed enhancement layer; and reconstructing the video stream by combining the low frequency sub-band partition and the high frequency sub-band partition based on at least one of the coding information associated with the base layer bitstream or the coding information associated with the enhancement layer bitstream.

10. The non-transitory computer-readable storage medium of claim 9, wherein the base layer and the enhancement layer are combined into the reconstructed video stream using at least one of the coding information associated with the base layer bitstream or the coding information associated with the enhancement layer bitstream.

11. The non-transitory computer-readable storage medium of claim 9, wherein the enhancement layer bitstream comprises a first enhancement layer bitstream and a second enhancement layer bitstream and the high frequency sub-band partition comprises a first high frequency sub-band partition and a second high frequency sub-band partition, and wherein reconstructing the video stream by combining the low frequency sub-band partition and the high frequency sub-band partition based on at least one of the coding information associated with the base layer bitstream or the coding information associated with the enhancement layer bitstream comprises:

reconstructing the video stream by combining the low frequency sub-band partition, the first high frequency sub-band partition, and the second high frequency sub-band partition, wherein the first enhancement layer is reconstructed by decoding the first enhancement layer bitstream based on coding information associated with the first enhancement layer bitstream, and wherein the second enhancement layer is reconstructed by decoding the second enhancement layer based on coding information associated with the second enhancement layer bitstream.

12. The non-transitory computer-readable storage medium of claim 9, wherein the base layer bitstream is decoded into the base layer based on the coding information associated with the base layer bitstream and partitions of the base layer, and wherein the enhancement layer bitstream is decoded into the enhancement layer based on the coding information associated with the enhancement layer bitstream and partitions of the enhancement layer.

* * * * *